(12) United States Patent
Ionita

(10) Patent No.: US 10,210,380 B2
(45) Date of Patent: Feb. 19, 2019

(54) METHODS AND SYSTEMS FOR ENHANCING USER LIVENESS DETECTION

(71) Applicant: Mircea Ionita, Dublin (IE)

(72) Inventor: Mircea Ionita, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 133 days.

(21) Appl. No.: 15/265,012

(22) Filed: Sep. 14, 2016

(65) Prior Publication Data

US 2018/0046852 A1    Feb. 15, 2018

Related U.S. Application Data

(63) Continuation-in-part of application No. 15/231,863, filed on Aug. 9, 2016.

(51) Int. Cl.
| | | |
|---|---|---|
| *G06K 9/62* | (2006.01) | |
| *G06K 9/00* | (2006.01) | |
| *G06K 9/52* | (2006.01) | |
| *G06T 7/60* | (2017.01) | |
| *G06K 9/46* | (2006.01) | |

(52) U.S. Cl.
CPC ..... *G06K 9/00288* (2013.01); *G06K 9/00228* (2013.01); *G06K 9/00906* (2013.01); *G06K 9/4652* (2013.01); *G06K 9/52* (2013.01); *G06T 7/60* (2013.01)

(58) Field of Classification Search
CPC .. G06K 9/00906; G06K 9/00221–2009/00328
See application file for complete search history.

(56) References Cited

U.S. PATENT DOCUMENTS

| | | | |
|---|---|---|---|
| 7,027,617 B1 * | 4/2006 | Frischholz | G06F 21/32 340/5.83 |
| 7,630,522 B2 | 12/2009 | Popp et al. | |
| 8,457,367 B1 | 6/2013 | Sipe et al. | |
| 8,542,879 B1 | 9/2013 | Nechyba et al. | |
| 8,676,123 B1 | 3/2014 | Hinkle | |
| 9,025,830 B2 | 5/2015 | Ma et al. | |
| 9,105,132 B2 | 8/2015 | Thom | |
| 9,137,246 B2 | 9/2015 | Parry et al. | |

(Continued)

FOREIGN PATENT DOCUMENTS

| | | |
|---|---|---|
| CN | 201410483249.2 | 9/2014 |
| EP | 2 725 521 A2 | 4/2014 |

OTHER PUBLICATIONS

European Search Report from EPO Application No. 17183890.7, dated Dec. 12, 2017, pp. 1-6.

*Primary Examiner* — Brian Werner
(74) *Attorney, Agent, or Firm* — Kevin McDermott, Esq.

(57) ABSTRACT

A method for enhancing user liveness detection is provided that includes calculating, by a computing device, parameters for each frame in a video of captured face biometric data. Each parameter results from movement of at least one of the computing device and the biometric data during capture of the biometric data. The method also includes creating a signal for each parameter and calculating a similarity score. The similarity score indicates the similarity between the signals. Moreover, the method includes determining the user is live when the similarity score is at least equal to a threshold score.

9 Claims, 12 Drawing Sheets

(56) References Cited

U.S. PATENT DOCUMENTS

| | | |
|---|---|---|
| 9,202,105 B1 | 12/2015 | Wang et al. |
| 9,392,460 B1 | 7/2016 | Blake et al. |
| 9,395,562 B1 | 7/2016 | Nguyen et al. |
| 9,600,649 B2 | 3/2017 | Parry et al. |
| 9,953,149 B2 | 4/2018 | Tussy |
| 10,084,776 B2 | 9/2018 | Ionita et al. |
| 2004/0234120 A1 | 11/2004 | Honda et al. |
| 2006/0206724 A1 | 9/2006 | Schaufele et al. |
| 2007/0226509 A1 | 9/2007 | Senga et al. |
| 2008/0192980 A1* | 8/2008 | Park .................. G06K 9/00221 382/103 |
| 2009/0137286 A1 | 5/2009 | Luke et al. |
| 2009/0309698 A1 | 12/2009 | Headley et al. |
| 2010/0149365 A1 | 6/2010 | Ishihara |
| 2011/0254942 A1* | 10/2011 | Suzuki ............... G06K 9/00221 348/77 |
| 2012/0027292 A1* | 2/2012 | Kozakaya .......... G06K 9/00255 382/154 |
| 2012/0036433 A1 | 2/2012 | Zimmer et al. |
| 2012/0069308 A1 | 3/2012 | Satake et al. |
| 2013/0016882 A1* | 1/2013 | Cavallini ............. G06K 9/629 382/117 |
| 2013/0069988 A1 | 3/2013 | Kamei et al. |
| 2013/0188840 A1 | 7/2013 | Ma et al. |
| 2013/0222236 A1 | 8/2013 | Gardenfors et al. |
| 2013/0254909 A1 | 9/2013 | Marengo et al. |
| 2013/0329014 A1 | 12/2013 | Obata |
| 2014/0009387 A1 | 1/2014 | Hwang |
| 2014/0016837 A1 | 1/2014 | Nechyba et al. |
| 2014/0270412 A1 | 9/2014 | Ma et al. |
| 2014/0330900 A1 | 11/2014 | Libin et al. |
| 2014/0347397 A1 | 11/2014 | Wu |
| 2015/0033305 A1 | 1/2015 | Shear et al. |
| 2015/0104081 A1 | 4/2015 | Ionita |
| 2015/0128075 A1 | 5/2015 | Kempinski |
| 2015/0169943 A1 | 6/2015 | Khitrov et al. |
| 2015/0264567 A1 | 9/2015 | Sensharma et al. |
| 2016/0026782 A1 | 1/2016 | Smowton et al. |
| 2016/0035096 A1 | 2/2016 | Rudow et al. |
| 2016/0063235 A1 | 3/2016 | Tussy |
| 2016/0182503 A1 | 6/2016 | Cheng et al. |
| 2016/0188958 A1* | 6/2016 | Martin ............... G06K 9/00228 382/118 |
| 2016/0294824 A1 | 10/2016 | Sezille |
| 2016/0300099 A1 | 10/2016 | Xiaolu et al. |
| 2016/0353018 A1 | 12/2016 | Anderson et al. |
| 2016/0373647 A1 | 12/2016 | Garcia Morate et al. |
| 2017/0063852 A1 | 3/2017 | Azar et al. |
| 2017/0193215 A1 | 7/2017 | Parry et al. |
| 2017/0262961 A1 | 9/2017 | Ekambaram et al. |
| 2017/0308738 A1 | 10/2017 | Zhang et al. |
| 2017/0310898 A1 | 10/2017 | Misawa et al. |
| 2018/0173979 A1 | 6/2018 | Fan |

\* cited by examiner

METHODS AND SYSTEMS FOR ENHANCING USER LIVENESS DETECTION

CROSS-REFERENCE TO RELATED APPLICATIONS

This is a continuation-in-part application of U.S. patent application Ser. No. 15/231,863, filed Aug. 9, 2016, the disclosure of which is incorporated herein by reference.

BACKGROUND OF THE INVENTION

This invention relates generally to user liveness detection, and more particularly, to methods and systems for enhancing user liveness detection.

Users conduct transactions with service providers in person and remotely over the Internet. Network-based transactions conducted over the Internet may involve purchasing items from a merchant website or accessing confidential information from a website. Service providers that own and operate such websites typically require successfully authenticating a user before allowing that user to conduct a desired transaction.

Typically, during network-based biometric authentication transactions conducted with a user at a remote location, the user provides a claim of identity and biometric data. However, imposters have been known to impersonate users by providing a false claim of identity supported by fraudulent biometric data in an effort to deceive a service provider into concluding the imposter is the person he or she claims to be. Such impersonations are known as spoofing.

Impostors have been known to use many methods to obtain or create fraudulent biometric data of others that can be submitted during authentication transactions. For example, imposters have been known to obtain two-dimensional pictures from social networking sites which can be presented to a camera during authentication to support a false claim of identity. Imposters have also been known to make physical models of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine biometric data. The imposters use the obtained biometric data for playback during fraudulent network-based authentication transactions. Such fraudulent biometric data are difficult to detect using known liveness detection methods. Consequently, accurately conducting network-based biometric authentication transactions with biometric data captured from a user at a remote location depends on verifying the physical presence of the user during the authentication transaction as well as accurately verifying the identity of the user with the captured biometric data. Verifying that the biometric data presented during a network-based biometric authentication transaction conducted at a remote location is from a live person at the remote location, is known as liveness detection or anti-spoofing.

Liveness detection methods have been known to use structure derived from motion of a biometric modality, such as a face, to distinguish a live user from a photographic image. Other methods have been known to detect sequential images of eyes or eye blink techniques, to determine if face biometric data is from a live user. Yet other methods have been known to illuminate a biometric modality with a pattern to distinguish a live user from a photographic image. However, these methods may not be convenient for the user and may not detect spoofing attempts that use high definition video playback, and therefore may not provide high confidence liveness detection support for entities dependent upon accurate biometric authentication transaction results.

BRIEF DESCRIPTION OF THE INVENTION

In one aspect, a method for enhancing user liveness detection is provided that includes calculating, by a computing device, parameters for each frame in a video of captured face biometric data. Each parameter results from movement of at least one of the computing device and the biometric data during capture of the biometric data. Moreover, the method includes creating a signal for each parameter, calculating a similarity score, and determining the user is live when the similarity score is at least equal to a threshold score. The similarity score indicates the similarity between the signals.

In another aspect, a computing device for enhancing user liveness detection is provided that includes a processor and a memory. The memory is configured to store data and the computing device is associated with a network. The memory is in communication with the processor and has instructions stored thereon which, when read and executed by the processor, cause the computing device to calculate parameters for each frame in a video of captured face biometric data, wherein each parameter results from movement of at least one of the computing device and the biometric data during capture of the biometric data. The instructions which when read and executed by the processor further cause the computing device to create a signal for each parameter, calculate a similarity score, and determine the user is live when the similarity score is at least equal to a threshold score. The similarity score indicates the similarity between the signals.

In yet another aspect, a method for enhancing user liveness detection is provided that includes calculating, by a computing device, an illumination-based parameter for each frame in a video of captured face biometric data. The parameter results from movement of at least one of the computing device and the biometric data during capture of the biometric data. Moreover, the method includes creating a signal for the parameter, calculating a total change in the signal and incremental changes between sequential frames, and determining the user is live when the signal is monotonous, the total change is less than ten percent, and the incremental change between all sequential frames is less than twenty percent of the total change.

DETAILED DESCRIPTION OF THE INVENTION

Figure 1:
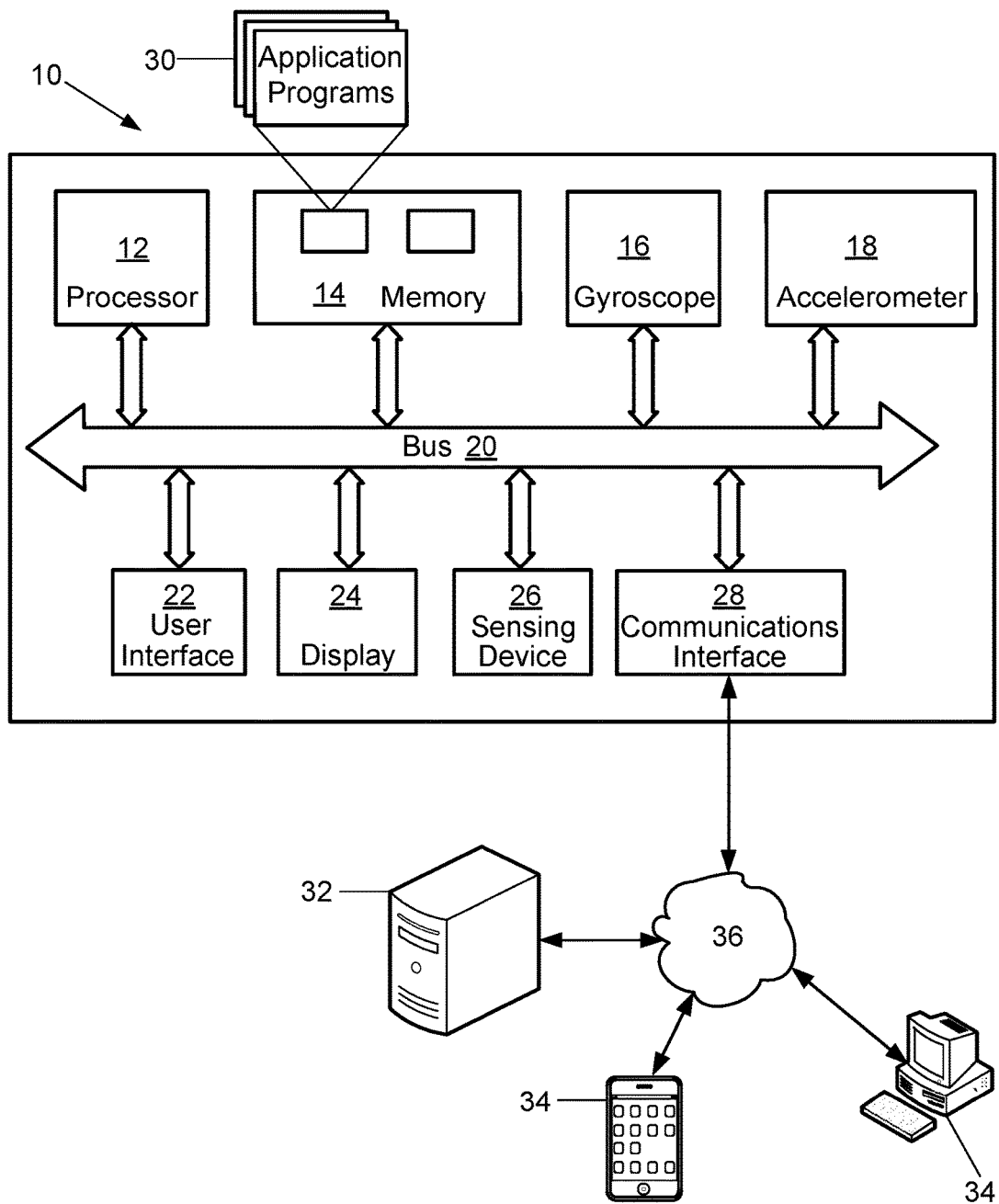
FIG. 1 is a diagram of an example computing device used for enhancing user liveness detection.

FIG. 1 is a diagram of an example computing device 10 used for enhancing user liveness detection. The computing device 10 includes one or more processors 12, a memory 14, a gyroscope 16, one or more accelerometers 18, a bus 20, a user interface 22, a display 24, a sensing device 26 and a communications interface 28. The computing device 10 may be any device capable of at least capturing and processing biometric data from users, and performing the functions described herein. One example of the computing device 10 is a smart phone. Other examples of the computing device 10 include, but are not limited to, a cellular phone, a tablet computer, a phablet computer, a laptop computer, a personal computer (PC), and any type of device having wired or wireless networking capabilities such as a personal digital assistant (PDA).

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are not intended to limit in any way the definition and/or meaning of the term "processor." General communication between the components in the computing device 10 is provided via the bus 20.

As used herein, the term "computer program" is intended to encompass an executable program that exists permanently or temporarily on any computer-readable recordable medium that causes the computing device 10 to perform at least the functions described herein. Application programs 30, also known as applications, are computer programs stored in the memory 14. Application programs 30 include, but are not limited to, an operating system, an Internet browser application, enrolment applications, authentication applications, user liveness detection applications, face tracking applications, applications that use pre-trained models based on machine learning algorithms, motion prediction applications, feature vector generator applications, active appearance applications, key point detection applications, and any special computer program that manages the relationship between application software and any suitable variety of hardware that helps to make-up a computer system or computing environment. Authentication applications enable the computing device 10 to conduct verification and identification transactions with any type of authentication data. Machine learning algorithm applications include at least classifiers and regressors. Key point detection applications enable the computing device 10 to detect points of interest in the background of a frame in a video, and to track the detected points of interest between frames in the video.

The memory 14 may be a computer-readable recording medium used to store data including, but not limited to, computer programs and user data records. The data record for each user may include record biometric data, record biometric templates and personal data of the user. The record biometric data is raw biometric data processed to generate at least one record biometric template. The record biometric template is typically used to verify the identity of a user. During a verification transaction, a biometric template is generated from biometric data captured from a user. The generated biometric template is compared against the corresponding user record biometric template, and if the generated and record templates match, the identity of the user is verified as true. Alternatively, the captured biometric data may be compared against the corresponding user record biometric data to verify the identity of the user.

Personal data includes any demographic information regarding a user including, but not limited to, a user's name, gender, age, date-of-birth, address, citizenship and marital status. Each data record may also include any kind of data that may be used to enhance the trustworthiness of user liveness detection results and authentication transaction results. The data records are typically for users associated with the computing device 10.

Configurable policies for enrolment and authentication transactions, some of which may be used to determine enrolment requirements and authentication data requirements, respectively, may also be stored in the memory 14. An enrolment data requirement is the data desired to be captured from users during enrolment. An authentication data requirement is the authentication data desired to be captured from users during either a verification or identification transaction. The enrolment and authentication data requirements may be for any biometric modality including, but not limited to, voice, face, finger, iris, palm, and electrocardiogram, and any combination of biometric modalities. Moreover, biometric data for these modalities may take any form such as, but not limited to, audio recordings, photographs, and video. For the example methods and systems described herein, the authentication data requirement is for face biometric data captured as a video. A video includes a sequence of frames.

When the biometric modality is face, the computing device 10 captures face biometric data as a video, extracts frames from the video, and assigns a time stamp to each frame in the video. The data for each frame may be stored in the memory 14 with other data generated by the computing device 10 for each respective frame. Thus, for each frame, all the frame data as stored in the memory 14 may be associated with other data generated for the frame. The captured face biometric data includes at least facial image data, while the other data may include parameters generated by the computing device 10 that are associated with movement of at least the computing device 10 during biometric data capture. Parameters include, but are not limited to, measurements made or calculated by the computing device 10, changes in the measurements, and measurements calculated from other measurements or calculations made by the computing device 10.

The enrolment and authentication data requirements may be any type of authentication data, or any combination of different types of authentication data, for example, Global Positioning Coordinates and biometric data, and may be determined in any manner. The enrolment and authentication data requirements may alternatively be determined by an individual or by any system 32 or device 34 configured to communicate with the computing device 10 over a network 36.

The memory 14 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 14 may include smart cards, SIMs or any other medium from which a computing device can read computer programs, applications or executable instructions.

The gyroscope 16 and the accelerometer 18 generate data regarding rotation and translation of the computing device 10 that may be communicated to the processor 12 and the memory 14 via the bus 20. The processor 12 may use the generated data to calculate the orientation and position of the computing device 10, calculate signals, and calculate the similarity between signals.

The user interface 22 and the display 24 allow interaction between a user and the computing device 10. The display 24 may include a visual display or monitor that displays information to a user. For example, the display 24 may be a Liquid Crystal Display (LCD), active matrix display, plasma display, or cathode ray tube (CRT). The user interface 22 may include a keypad, a keyboard, a mouse, an infrared light source, a microphone, cameras, and/or speakers. Moreover, the user interface 22 and the display 24 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 10 to enter data, change settings, control functions, etc. Consequently, when the touch screen is touched, the user interface 22 communicates this change to the processor 12, and settings can be changed or user entered information can be captured and stored in the memory 14.

The sensing device 26 may include Radio Frequency Identification (RFID) components or systems for receiving information from other devices. The sensing device 26 may also include components with Bluetooth, Near Field Communication (NFC), infrared, or other similar capabilities. The computing device 10 may alternatively not include the sensing device 26.

The communications interface 28 provides the computing device 10 with two-way data communications. Moreover, the communications interface 28 enables the computing device 10 to conduct wireless communications such as cellular telephone calls and to wirelessly access the Internet over the network 36. By way of example, the communications interface 28 may be a digital subscriber line (DSL) card or modem, an integrated services digital network (ISDN) card, a cable modem, or a telephone modem to provide a data communication connection to a corresponding type of telephone line. As another example, the communications interface 28 may be a local area network (LAN) card (e.g., for Ethernet™ or an Asynchronous Transfer Model (ATM) network) to provide a data communication connection to a compatible LAN. As yet another example, the communications interface 28 may be a wire or a cable connecting the computing device 10 with a LAN, or with accessories such as biometric capture devices. Further, the communications interface 28 may include peripheral interface devices, such as a Universal Serial Bus (USB) interface, a PCMCIA (Personal Computer Memory Card International Association) interface, and the like. Thus, it should be understood that the communications interface 28 may enable the computing device 10 to conduct any type of wireless or wired communications such as, but not limited to, accessing the Internet. Although the computing device 10 includes a single communications interface 28, the computing device 10 may alternatively include multiple communications interfaces 28.

The communications interface 28 also allows the exchange of information across the network 36. The exchange of information may involve the transmission of radio frequency (RF) signals through an antenna (not shown). Moreover, the exchange of information may be between the computing device 10 and any other computer systems 32 and any other computing devices 34 capable of communicating over the network 36. The network 36 may be a 5G communications network. Alternatively, the network 36 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 36 may also be any type of wired network or a combination of wired and wireless networks.

Examples of computer systems 32 the computing device 10 may communicate with include computer systems of service providers such as, but not limited to, financial institutions, medical facilities, national security agencies, merchants, and authenticators. Examples of other computing devices 34 the computing device 10 may communicate with include, but are not limited to, smart phones, tablet computers, phablet computers, laptop computers, personal computers and cellular phones. The computing devices 34 may be associated with any individual or with any type of entity including, but not limited to, commercial and non-commercial entities. The computing devices 10, 34 may alternatively be referred to as computer systems or information systems, while the computer system 32 may alternatively be referred to as a computing device or an information system.

Figure 2:
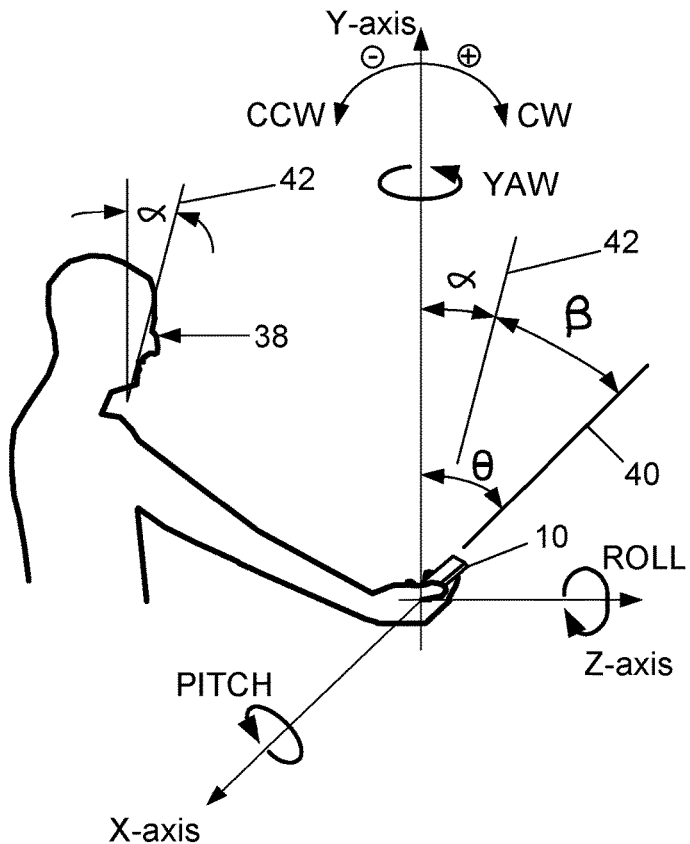
FIG. 2 is a side view of a user operating the example computing device in which the computing device is in a first position.

FIG. 2 is a side view of a person 38 operating the computing device 10 in which the computing device 10 is in a first position. The first position is the position in which a person naturally holds the computing device 10 when starting to capture biometric data from his or her self. Because people have different natural tendencies, the first position of the computing device 10 is typically different for different people. Alternatively, a person different from the person 38 may operate the computing device 10 to capture biometric data from the person 38. Any person operating the computing device 10 may be referred to herein as a user.

A three-dimensional Cartesian coordinate system having X, Y, and Z-axes is mathematically positioned on the computing device 10. The coordinate system may be mathematically positioned in any manner on the computing device 10 that enables generating at least one parameter usable for creating a signal that represents changes in the parameter over time. The coordinate system represents the three-dimensional space through which the computing device 10 may freely move.

The computing device 10 may be rotated about any combination of the X, Y, and Z-axes, and may be translated along any combination of the X, Y, and Z-axes. Rotation of the computing device 10 about the X-axis is called pitch (i.e., pitch angle), rotation of the computing device 10 about the Y-axis is called yaw (i.e., yaw angle), and rotation of the computing device 10 about the Z-axis is called roll (i.e., roll angle). The computing device 10 may also be simultaneously rotated about and translated along any combination of the X, Y and Z-axes in any manner. Angles measured clockwise CW from the Y-axis are positive while angles B measured counter clockwise CCW from the Y-axis are negative.

A front face of the computing device 10 defines a plane 40 and the face of the user 38 defines another plane 42. The plane 40 forms a first angle theta ($\theta$) with respect to the Y-axis. The plane 42 forms an angle alpha ($\alpha$) with respect to a vertical axis, which is parallel to the Y-axis, and is included in the X, Y, and Z coordinate system. The planes 40 and 42 form an angle beta ($\beta$). In the first position, the angles $\theta$ and $\beta$ typically are different and the planes 40 and 42 typically are not parallel. The angles $\theta$, $\beta$, and $\alpha$ as well as the planes 40 and 42 are examples of parameters that may be generated by the computing device 10.

When the angles $\theta$ and $\beta$ are each about zero and the planes 40 and 42 are approximately parallel, the computing device is in the second position. While in the second position the computing device 10 is best positioned to capture biometric data usable for generating trustworthy authentication transaction results. Biometric data for enhancing trustworthiness of authentication transaction results may be captured when the angles $\theta$ and $\beta$ are each close to zero degrees, for example, between about minus five degrees and plus five degrees. Thus, it is not necessary that the angles $\theta$ and $\beta$ be exactly zero to capture biometric data for enhancing the trustworthiness of authentication transaction results.

Figure 3:
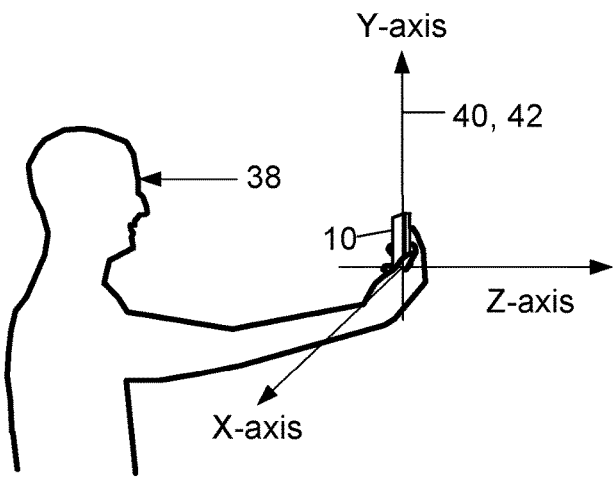
FIG. 3 is a side view of the user operating the example computing device in which the computing device is in a second position.

FIG. 3 is a side view of the user 38 operating the computing device 10 in which the computing device 10 is in a second position, the angles $\theta$ and $\beta$ are each about zero, and the planes 40 and 42 are approximately aligned with the Y-axis. The angles $\theta$ and $\beta$ may alternatively be zero and the planes 40 and 42 may alternatively be coincident with the Y-axis. The computing device 10 is also at about the same level as the head of the user.

Trustworthy authentication transaction results may also be generated from biometric data captured while moving the computing device 10 from the first to a second position. Moreover, any frame or combination of frames from the captured biometric data video may be used to generate trustworthy authentication transaction results.

Figure 4:
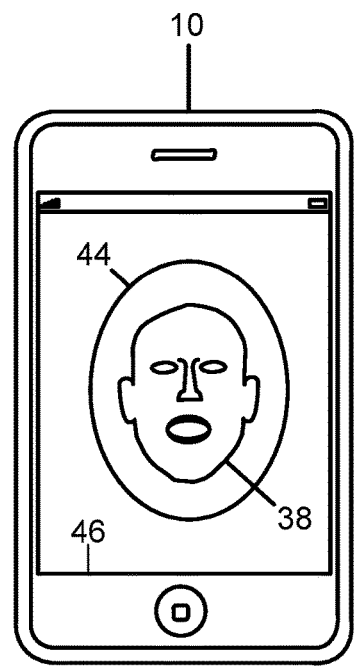
FIG. 4 is a front view of the example computing device displaying an example visual aid and an image of the user within the visual aid.

FIG. 4 is a front view of the computing device 10 displaying an example visual aid 44 and a facial image of the user 38 positioned within the visual aid 44. The visual aid 44 may be displayed by the computing device 10 and functions as a guide that enables users to capture data usable for enhancing user liveness detection and generating trustworthy authentication transaction results. One example of the visual aid 44 is an oval. Other examples of the visual aid 44 include, but are not limited to, a circle, a square, a rectangle, and an outline of the head of the user. Moreover, the visual aid may be any shape defined by lines and curves. However, it is not necessary that the visual aid 44 be displayed by the computing device 10. The visual aid 44 may alternatively be a part of the computing device 10 itself. Thus, another example of the visual aid 44 may be a perimeter 46 of the computing device 10 display screen.

The displayed image of the user 38 is to be positioned within the visual aid 44 while capturing biometric data and moving the computing device 10 from the first to the second position. The displayed image may be close to the visual aid 44 border but not outside the border. Staying within the visual aid 44 facilitates capturing biometric data usable in generating trustworthy authentication transaction results and enhancing user liveness detection. Alternatively, a small percentage of the facial image may be allowed to extend beyond the border of the visual aid 44 so long as trustworthy user liveness detection results may be calculated as described herein.

The user 38 starts capturing biometric data with the computing device 10 when the device 10 is in the first position. Because adequate quality biometric data usable for generating trustworthy authentication results is typically not obtained in the first position, a prompt is displayed by the computing device 10 for the user to see. The prompt may be any information that causes the user to move the computing device 10 into the second position. For example, the prompt may be an arrow pointing in the direction that the user is to move the computing device 10, or a message instructing the user to move the computing device 10 to be about level with the head of the user. Users typically move the computing device 10 from the first to the second position in a manner that is natural to them. The user 38 may translate and rotate the computing device 10 into the second position in any manner. For example, the user may change the distance between the computing device 10 and the face of the user while moving the computing device 10 into the second position. While moving the computing device 10 into the second position, the user also positions his or her head to be more vertical.

The user may cause the computing device 10 to start capturing biometric data, or the computing device 10 may start capturing biometric data automatically. For example, the computing device 10 may start capturing biometric data automatically when the prompt is displayed.

In response to the prompt, the user 38 moves the computing device 10 into the second position. While moving the device 10, the user aims the computing device 10 at his or her self, such that the image of his or her face displayed by the computing device 10 is within the visual aid 44. While being moved into the second position, the computing device continuously captures biometric data. Biometric data capture stops when the computing device 10 is in the second position. The user may cause the computing device 10 to stop capturing biometric data, or the computing device 10 may stop capturing biometric data automatically when the angles $\theta$ and $\beta$ are each between about minus five degrees and plus five degrees.

The computing device 10 calculates the angle $\theta$ for a frame from data generated by the accelerometer 18 and the gyroscope 16 for that frame. Alternatively, the angle $\theta$ may be calculated from data generated by only the accelerometer 18. A face pose detection application may be used to calculate the angle $\beta$ for a frame from the image data for that frame. Alternatively, any application that may cause the computing device 10 to calculate the angle $\beta$ for a frame from the image data for that frame, or from any other data for that frame, may be used. The computing device 10 may calculate the angle $\alpha$ for a frame by any means, for example, from the image data for that frame.

The computing device 10 calculates an X component (i.e., $\theta_x$ and $\beta_x$), a Y-component (i.e., $\theta_Y$ and $\beta_Y$), and a Z-component (i.e., $\theta_Z$ and $\beta_Z$) for the angles $\theta$ and $\beta$ in each frame. Due to the nature of the movement from the first to the second position, the most significant angular change occurs about the X-axis. Typically, there is less significant angular change about the Y and Z-axes. A significant angular change about the Y or Z-axis may be evidence the user has not moved the computing device 10 in accordance with the prompt, so the calculated angles $\theta$ and $\beta$ are deemed faulty and thus not usable for detecting user liveness. A significant angular change may be any angular change that enables detecting movement that does not comply with the prompt. For example, a significant angular change may be between five and ten degrees. The angular change about the Y or Z-axis may be measured with respect to the initial values of the angles $\theta$ (i.e., $\theta_Y$, $\theta_Z$) and $\beta$ (i.e., $\beta_Y$, $\beta_Z$) in the first position. Faulty data may also be detected using a face tracker application that analyzes face image data included in the captured biometric data to detect any anomalies. For example, an anomaly may be a bend detected in a photograph used by an imposter during a spoofing attempt. If any anomalies are detected, the calculated angular data (i.e., $\theta_x$ and $\beta_x$) are deemed faulty and not usable for detecting user liveness.

The X, Y, and Z-components of the angles $\theta$ and $\beta$ may be plotted over time to generate a signal for each component. Thus, at least six signals may be generated. Signals generated from faulty angles $\theta$ and $\beta$ are also deemed faulty and cannot be used to detect user liveness.

Figure 5:
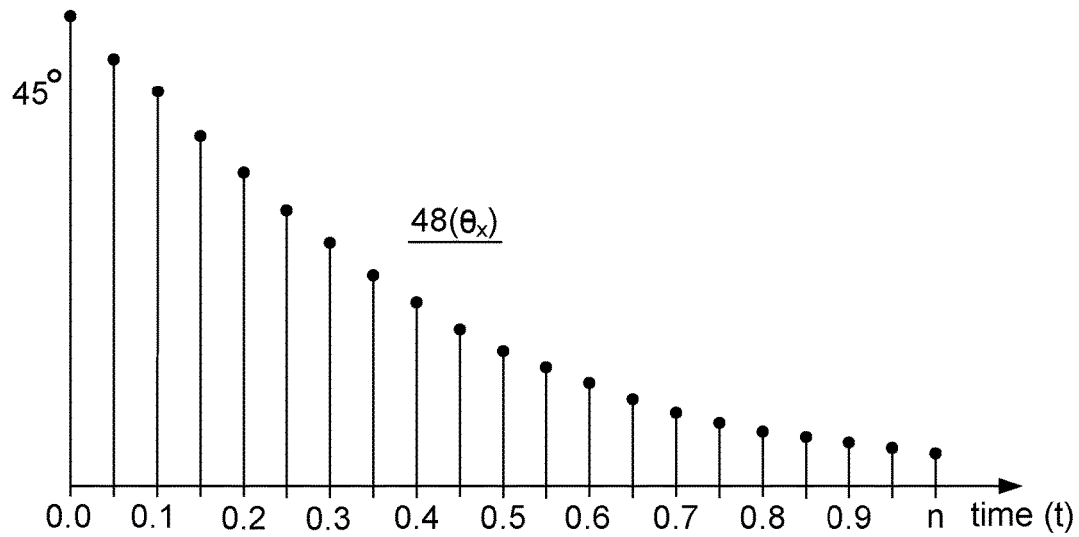
FIG. 5 is a diagram illustrating an example first signal for the X-component of a parameter.

FIG. 5 is a diagram illustrating an example signal 48 for the X-component of the angle $\theta$ (i.e., $\theta_x$). The signal 48 is created by plotting the value of the angle $\theta_x$ for each frame in the video, as the computing device 10 is moved from the first to the second position. The signal 48 is a discrete signal that represents the change in the angle $\theta_x$ over time. The time t=0.0 seconds corresponds to the time at which the user initiates moving the computing device 10 from the first position to the second position. The time "n" indicates the time at which insignificant sequential changes in the angle $\theta$ begin to occur. Such insignificant changes may be between plus and minus one degree. Alternatively, insignificant changes in the angle $\theta$ may be within any range deemed suitable for establishing an end of the signal 48. For the example signal 48, n=1.0 second. The time "n" may vary based on how the computing device 10 is moved from the first to the second position by the user. The value of $\theta_x$ at time t=0.0 seconds is forty-five degrees and at time t=n seconds is about zero degrees.

Figure 6:
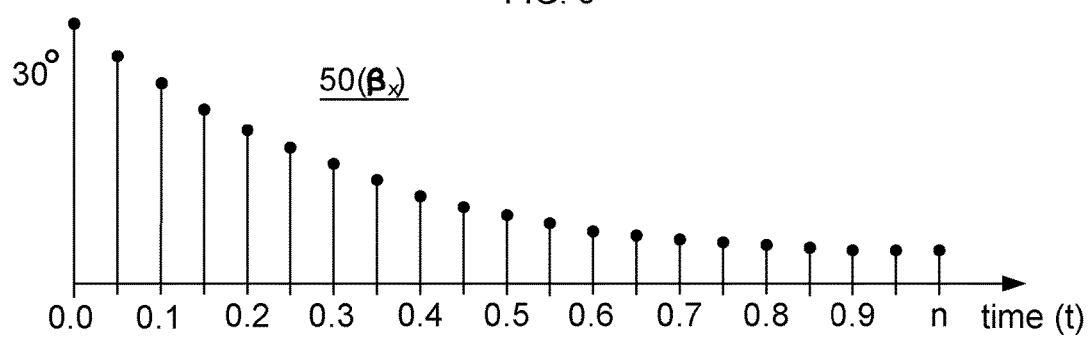
FIG. 6 is a diagram illustrating an example second signal for the X-component of another parameter.

FIG. 6 is a diagram illustrating an example signal 50 for the X-component of the angle $\beta$ (i.e., $\beta_x$). The signal 50 is created by plotting the value of the angle $\beta_x$ versus time, as the computing device 10 is moved from the first to the second position. The signal 50 is a discrete signal that represents the change in $\beta_x$ over time. The time t=0.0 seconds and t=n seconds are the same as for the example signal 48. The value of $\beta_x$ at time t=0.0 seconds is thirty degrees and at time t=n seconds is about the same as $\theta_x$, which is about zero degrees.

Figure 7:
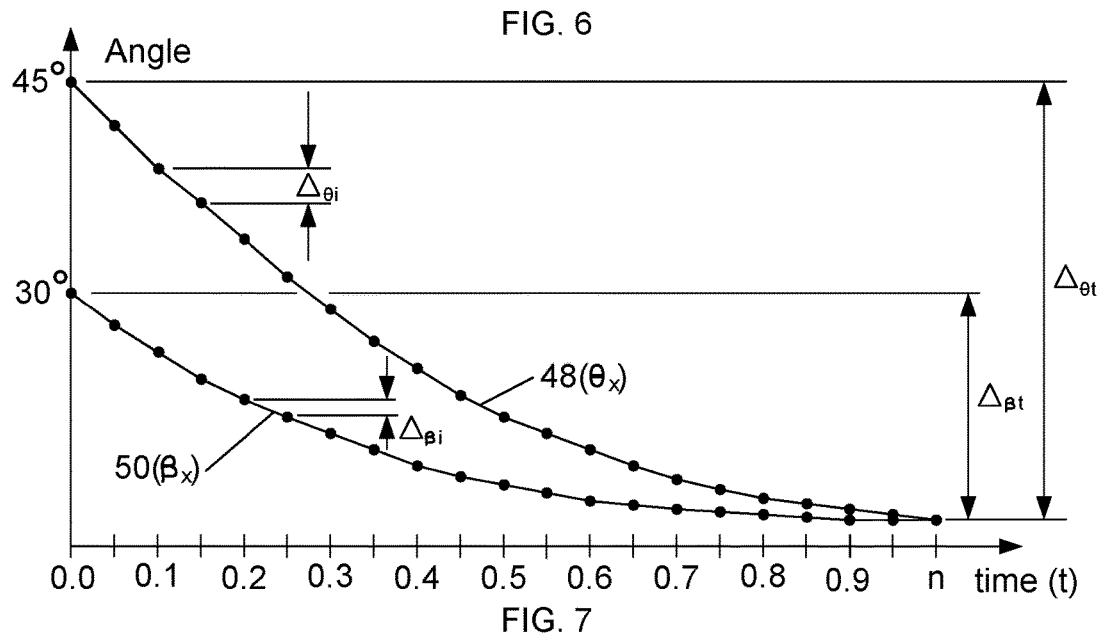
FIG. 7 is a diagram illustrating the signals as shown in FIGS. 5 and 6.

FIG. 7 is a diagram illustrating the signals 48 and 50 in which values of the angle $\theta_x$ at each time "t" have been plotted and sequential values have been connected with a line. Likewise, the values of the angle $\beta_x$ have been plotted and sequential values have been connected with a line. The total change in the signal 48 is $\Delta_{\theta t}$ and the total change for the signal 50 is $\Delta_{\beta t}$. The total change $\Delta_{\theta t}$ between time t=0 and t=n is about forty-five degrees, and the total change $\Delta_{\beta t}$ between time t=0 and t=n is about thirty degrees. Additionally, the incremental change for signal 48 is $\Delta_{\theta i}$ and the incremental change for the signal 50 is $\Delta_{\beta i}$.

Figure 8:
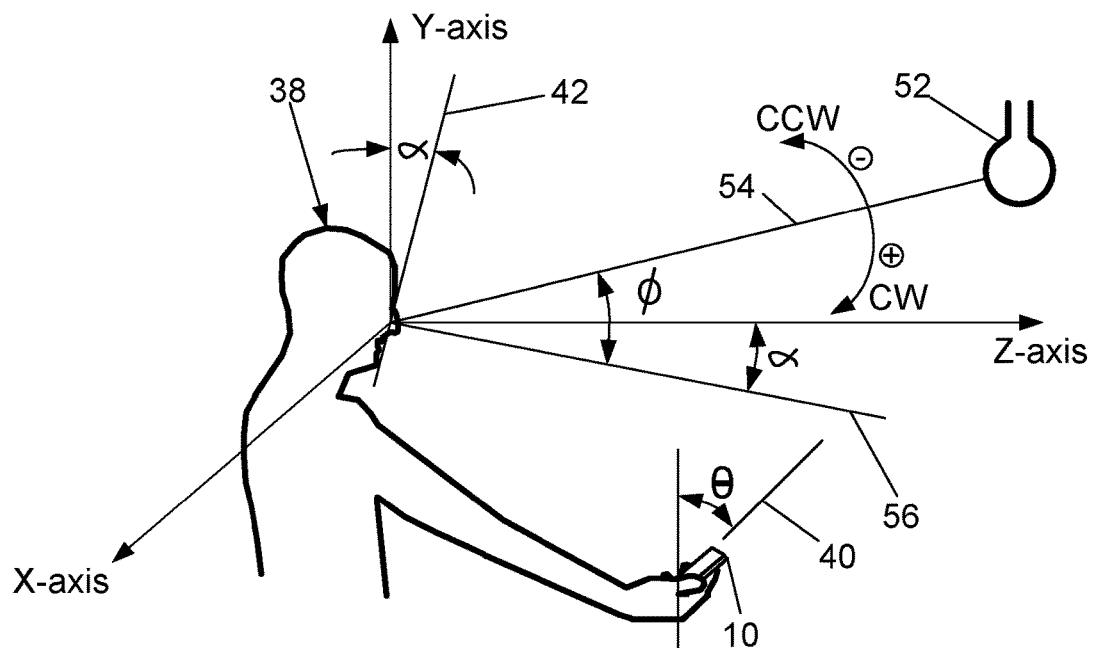
FIG. 8 is a side view of the user operating the example computing device in which the computing device is in the first position as shown in FIG. 2.
Figure 9:
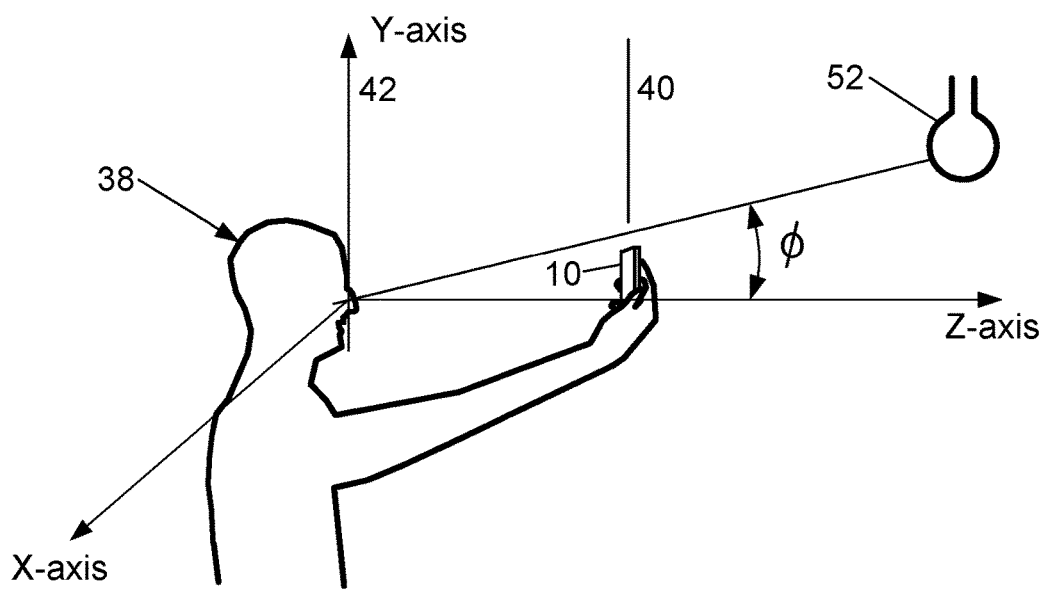
FIG. 9 is a side view of the user operating the example computing device in which the computing device is in the second position, as shown in FIG. 3.

The information shown in FIGS. 8 and 9 is similar to the information shown in FIGS. 2 and 3, respectively, as described in more detail below. As such, features illustrated in FIGS. 8 and 9 that are identical to features illustrated in FIGS. 2 and 3, respectively, are identified using the same reference numerals used in FIGS. 2 and 3.

FIG. 8 is the side view of the user 38 operating the computing device 10 in which the computing device 10 is in the first position, similar to FIG. 2. However, a light source 52 illuminates the user while operating the device 10 and the Cartesian coordinate system is mathematically positioned on the user 38. Example light sources 52 include, but are not limited to, incandescent ceiling lighting, a lamp mounted on a wall or placed on furniture, the computing device 10, and the sun. The coordinate system may be mathematically positioned on the user in any manner that enables generating at least one parameter usable for creating a signal that represents changes in the parameter over time.

The light source 52 may be a single light source or multiple light sources. Multiple light sources include any combination of the same or different types of light sources. The light source 52, or sources, are typically stationary while the user operates the computing device 10. The user may be illuminated by light directly from the light source 52 or may be illuminated by indirect light. Indirect light is light produced by the light source 52 that interacts with a feature before illuminating the user. Example features include, but are not limited to, walls, mirrors, curtains and glass. For example, indirect light may reflect off a wall or mirror before illuminating the user. Alternatively, or additionally, indirect light may be refracted by glass before illuminating the user.

The computing device 10 calculates an illumination line 54 between the light source 52 and the face of the user 38. The illumination line 54 represents the ambient light direction between the light source 52 and the user 38. When multiple light sources 52 are used, the illumination line 54 is calculated as the combined effect of the multiple sources.

For each frame in a video of captured biometric data, the computing device 10 also calculates a line 56 normal to the plane 42 and an angle phi ($\phi$) between the normal line 56 and the illumination line 54. When the angles $\theta$ and $\alpha$ are each about zero, the computing device 10 is in the second position and is positioned to capture biometric data usable for generating trustworthy authentication transaction results. Angles measured clockwise CW from the illumination line 54 are positive while angles measured counter clockwise CCW are negative.

FIG. 9 is the side view of the user 38 operating the computing device 10 in the second position, similar to FIG. 3. However, the angles $\theta$ and $\alpha$ are each about zero, the plane 42 is approximately aligned with the Y-axis, and the plane 40 is about parallel to the Y-axis. The angles $\alpha$ and $\theta$ may alternatively be zero such that the plane 42 is coincident with the Y-axis and the plane 40 is parallel with the Y-axis. The user operates the computing device 10 to capture biometric data in the same way as described herein with regard to FIGS. 2 to 4. The computing device 10 may stop capturing biometric data automatically when the angles $\alpha$ and $\theta$ are each between about minus five and plus five degrees because biometric data for enhancing trustworthiness of authentication transaction results is usually captured within this range. Alternatively, the user may cause the computing device 10 to stop capturing biometric data.

The computing device 10 may project the facial image data from each frame in the captured biometric data video onto a geometrically normalized reference frame which preserves only the pixel intensity variations of the image. By doing so, the computing device 10 transforms the captured biometric image data for each frame into a normalized frame version that has only pixel intensity variations. Alternatively, the image data may be normalized in any manner that yields only pixel intensity variations. Normalizing the image data removes most of the geometric variations between frames. Moreover, the pixel variations in the normalized frame image data may be used to detect illumination variations between frames. The computing device 10 may process a gray scale version of the normalized frame data to determine user liveness or may process color information from the normalized frame data to determine user liveness.

While moving the computing device 10 into the second position, the user also positions his or her head to be more vertical and better align with the Y-axis. Such movement causes the angles $\alpha$ and $\phi$ to change. As a result, the facial illumination varies between frames of normalized image data. This facial illumination variation between normalized frame image data may be used to enhance user liveness detection. The facial illumination variation is the change in lighting of the biometric data between sequential frames of normalized image data. The facial illumination variations may be caused by changes in the angle $\phi$. The angle phi $\phi$, the illumination line 54, the normalized frame data, and illumination variation are additional examples of parameters that may be generated by the computing device 10.

The angle $\phi$ is calculated by an active appearance model application or the like. The active appearance model application is trained to learn correspondences between the normalized face image data and the angle $\phi$ of the light illuminating the face during capture. After being properly trained, the application is able to calculate the angle $\phi$ for every frame using parameters generated by the computing device 10 while moving the computing device 10 from the first to the second position. The application is able to calculate X, Y, and Z components for the angle phi $\phi$ which angles may be plotted over time to create a signal. Thus, at least three signals may be created.

Because the most significant angular changes occur about the X-axis, when the angle $\phi$ experiences a significant angular change about the Y or Z-axis, the calculated angle $\phi$ is deemed faulty and thus not usable for detecting user liveness. The change in the angle $\phi$ may be measured with respect to the initial values of the angle $\phi$ (i.e., $\phi_Y$, $\phi_Z$) in the first position. Signals generated from faulty angles $\phi$ and $\theta$ are also deemed faulty and cannot be used to detect user liveness.

Figure 10:
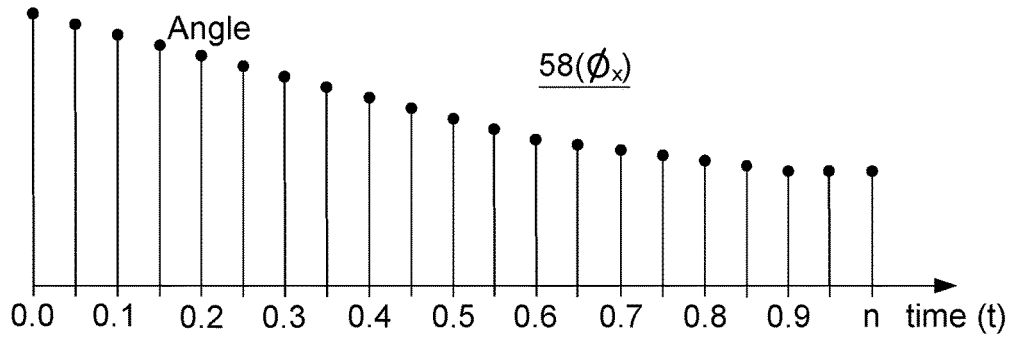
FIG. 10 is a diagram illustrating an example signal for the X-component of yet another parameter.

FIG. 10 is a diagram illustrating an example signal 58 for the X-component of the angle $\phi$ (i.e., $\phi_x$). The signal 58 is created by plotting the value of the angle $\phi_x$ for each frame over time as the computing device 10 is moved from the first to the second position. The signal 58 is a discrete signal that represents the change in the angle $\phi_x$ over time. The value of $\phi_x$ at time t=0.0 seconds may be any value depending on how the user holds the device 10 in the first position, and at time t=n seconds is approximately the angle between the illumination line 42 and the Z-axis. The time t=0.0 seconds and t="n" seconds are the same as for the example signal 48. The signal 58 represents illumination variations.

Figure 11:
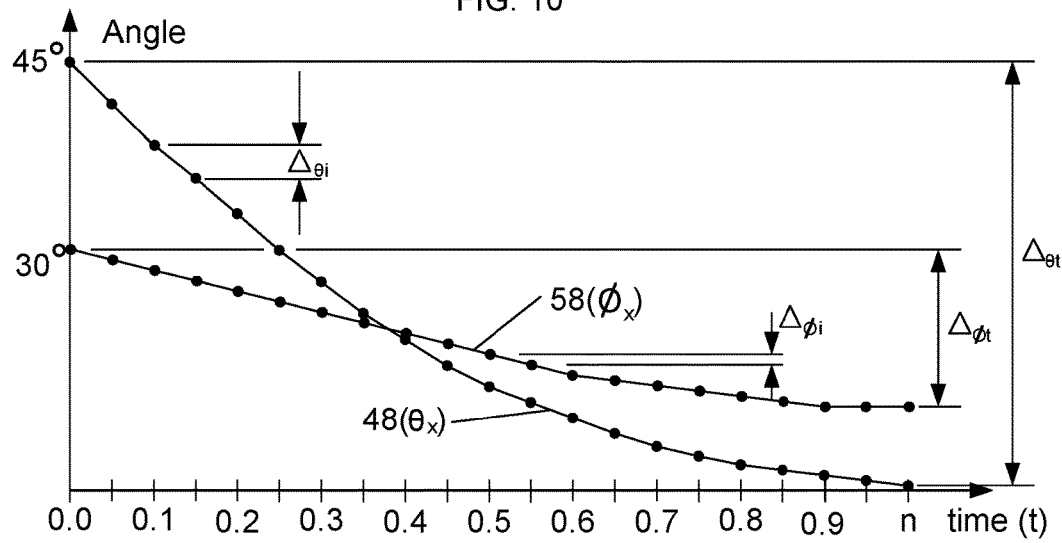
FIG. 11 is a diagram illustrating the signals as shown in FIGS. 5 and 10.

FIG. 11 is a diagram illustrating the signals 58 and 48 in which values of the angle $\phi_x$ have been plotted and sequential values have been connected with a line. Likewise, the values of the angle $\theta_x$ have been plotted and sequential values have been connected with a line. The total change in the signal 58 is $\Delta_{\theta t}$ and the total change for the signal 48 is $\Delta_{\theta t}$. Moreover, the incremental change for signal 58 is $\Delta_{\theta i}$ and the incremental change for the signal 48 is $\Delta_{\theta i}$.

The angles $\theta_x$, $\beta_x$, and $\phi_x$ at time t=0.0 seconds may vary depending on how the user holds the computing device 10 in the first position when initiating movement of the computing device 10. Although the angles $\theta_x$, $\beta_x$, and $\phi_x$ are forty-five, thirty, and thirty degrees, respectively, in the first position as described herein, the angles $\theta_x$, $\beta_x$, and $\phi_x$ may alternatively be any angle in the first position that may be used for detecting user liveness as described herein. For example, the angle $\theta_x$ may be any angle between twenty and fifty-five degrees.

Twenty-one different values of each angle (i.e., $\theta_x$, $\beta_x$, $\phi_x$) are plotted to create the signals 48, 50, and 58 which corresponds to a frame rate of twenty-one frames per second. At a frame rate of twenty-one frames per second, the time between plotted values is 0.05 seconds. Each 0.05 seconds is a temporal segment so the signals 48, 50, and 58 each include twenty (20) temporal segments. However, the frame rate, and consequently the number of values used to create the signals, may alternatively vary from a minimum of ten frames per second to a maximum of thirty frames per second. Frame rates between ten and thirty frames per second yield the most accurate user liveness detection results. The frame rates for each of the signals 48, 54, and 58 may be the same or different. The duration of the temporal segment typically varies with the frame rate. The frame rates described herein are uniform; however, the frame rates may alternatively not be uniform.

The total change $\Delta_{\theta t}$ between time t=0 and t=n is about fifteen degrees, and the total change $\Delta_{\theta t}$ between time t=0 and t=n is about forty-five degrees. Large incremental changes $\Delta_{\theta i}$, $\Delta_{\beta i}$, and $\Delta_{\theta i}$ in the signals 48, 50, and 58, respectively, between sequential frames may be evidence of a spoof attack. Incremental changes $\Delta_{\theta i}$, $\Delta_{\beta i}$, and $\Delta_{\phi i}$ no greater than twenty percent of the total change $\Delta_{\theta t}$, $\Delta_{\beta t}$, and $\Delta_{\phi t}$, respectively, typically are not evidence of a spoof attack. Consequently, the incremental changes $\Delta_{\theta i}$, $\Delta_{\beta i}$, and $\Delta_{\phi i}$ are limited to a maximum of twenty percent of the total changes $\Delta_{\theta t}$, $\Delta_{\beta t}$, and $\Delta_{\phi t}$, respectively. When the incremental changes $\Delta_{\theta i}$, $\Delta_{\beta i}$, and $\Delta_{\phi i}$ between all sequential frames in the respective signals are at most twenty percent of the total changes $\Delta_{\theta t}$, $\Delta_{\beta t}$, and $\Delta_{\phi t}$, respectively, the signals 48, 50, and 58 may be used to detect user liveness. Otherwise, the signals 48, 50 and 58 are considered faulty and are not usable for detecting user liveness. If one of the signals 48, 50, and 58 is deemed faulty, the other is also deemed faulty. Likewise, if one of the signals 50 or 58 is deemed faulty the other is also deemed faulty.

When a signal representing illumination variations is monotonous, has a total change of at least five degrees, and the incremental change between sequential frames is less than twenty percent of the total change, the user may be determined to be a live person. Thus, user liveness may be detected based on illumination change only. The total change in the signal 58 may alternatively be any change deemed to facilitate accurate user liveness detection based solely on illumination. For example, the total change may be at least ten degrees. Because the signal 58 is monotonous, changes more than five degrees, and includes incremental changes between all frames less than twenty percent of the total change, the signal 58 may be used to detect user liveness. A monotonous signal varies in one direction only.

Although the example incremental changes $\Delta_{\theta i}$, $\Delta_{\beta i}$, and $\Delta_{\phi i}$ are limited to a maximum of twenty percent of the total changes $\Delta_{\theta t}$, $\Delta_{\beta t}$, and $\Delta_{\phi t}$, respectively, the incremental changes $\Delta_{\theta i}$, $\Delta_{\beta i}$, and $\Delta_{\phi i}$ may alternatively be any percentage of the total changes $\Delta_{\theta t}$, $\Delta_{\beta t}$, and $\Delta_{\phi t}$, respectively, judged not to be evidence of a spoof attack. Different computing devices 10 associated with different users may allow for different maximum biometric data capture rates as well as different frame processing rates. To account for such different rates, the percentage of the total changes $\Delta_{\theta t}$, $\Delta_{\beta t}$, and $\Delta_{\phi t}$, respectively, may be normalized with respect to the frame capture rate of the computing device 10, or with respect to the frame processing rate of the computing device 10.

Figure 12:
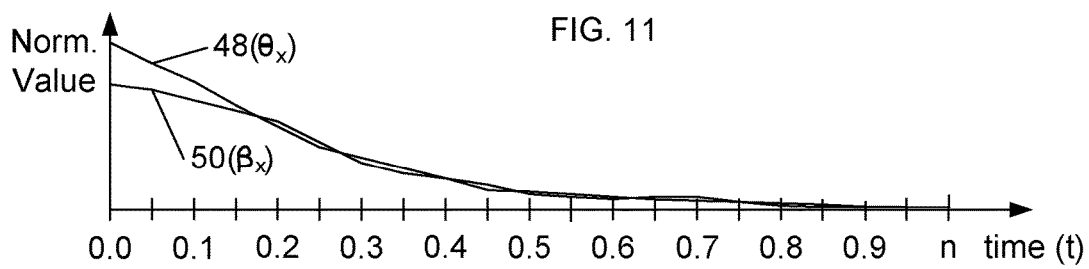
FIG. 12 is a diagram illustrating a normalized version of the signals shown in FIGS. 5 and 6.

FIG. 12 is a diagram illustrating normalized versions of signals 48 and 50 which appear more similar than the non-normalized versions.

Figure 13:
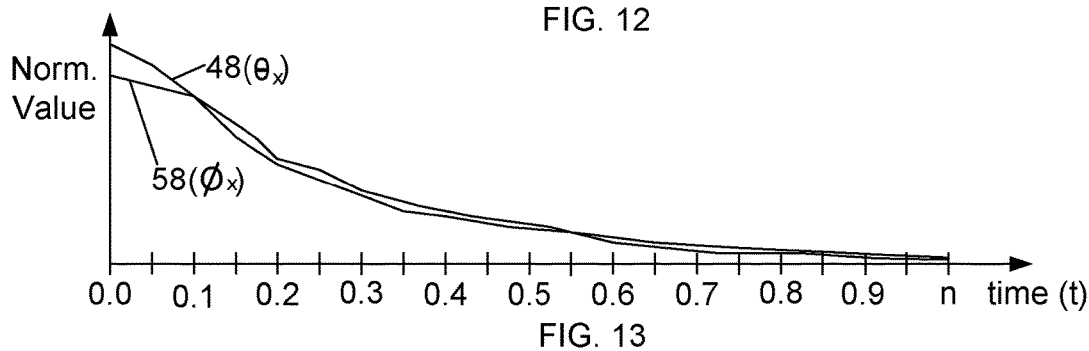
FIG. 13 is a diagram illustrating a normalized version of the signals shown in FIGS. 5 and 10.

FIG. 13 is a diagram illustrating normalized versions of signals 48 and 58 which appear more similar than the non-normalized versions.

The computing device 10 may calculate a similarity score which indicates the similarity between signals. The similarity score may be calculated as the correlation coefficient between signals. For example, a similarity score may be calculated between the signals 48 and 50. Likewise, a similarity score may be calculated between the signals 48 and 58. As part of calculating a correlation coefficient between signals the signals are normalized. When the similarity score is calculated as a correlation coefficient, the similarity score ranges between negative one and positive one. Similarity scores at least equal to a threshold score indicate the user is a live person. The threshold score is 0.70. However, the threshold score may alternatively be any value judged to enhance the accuracy of user liveness detection.

Figure 14:
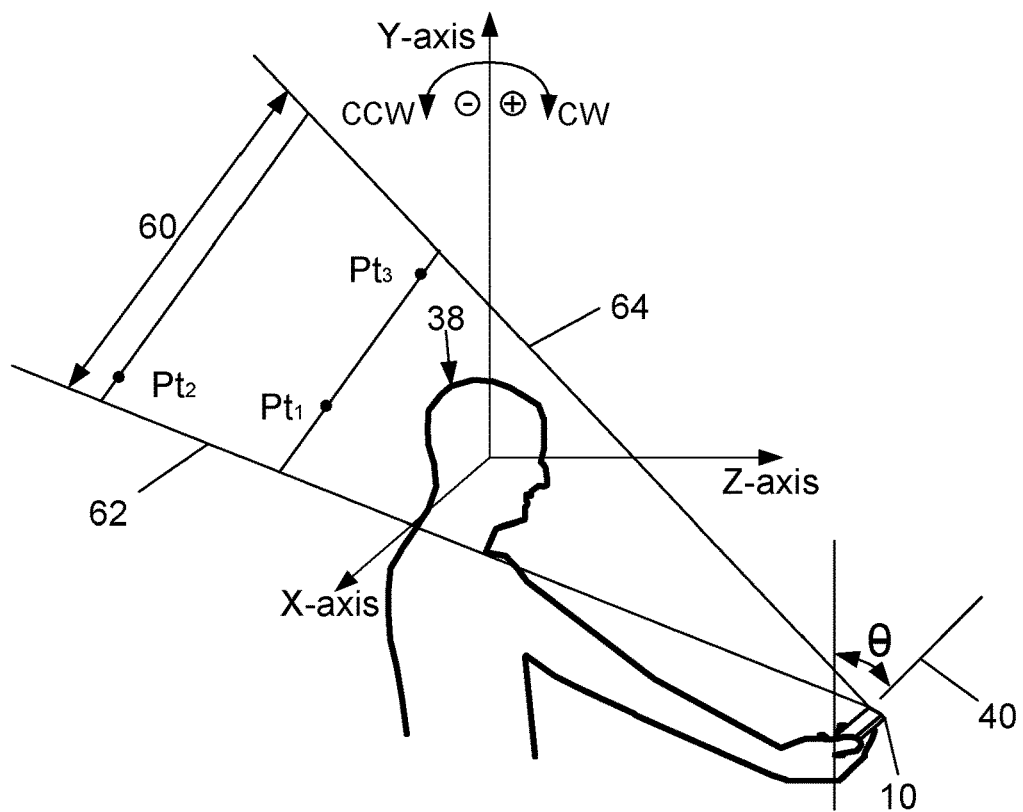
FIG. 14 is a side view of the user operating the example computing device in which the computing device is in the first position, as shown in FIGS. 2 and 8.
Figure 15:
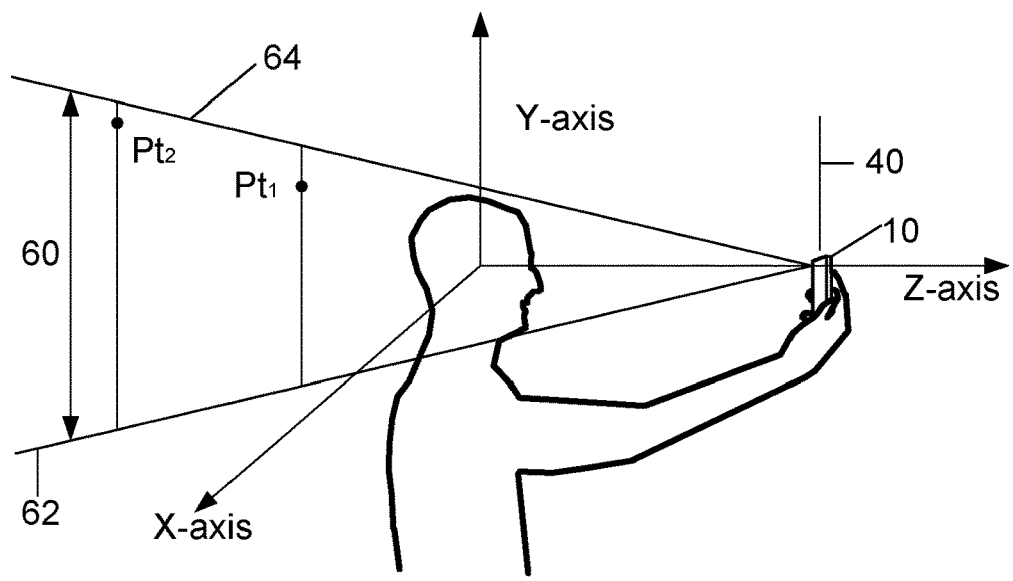
FIG. 15 is a side view of the user operating the example computing device in which the computing device is in the second position, as shown in FIGS. 3 and 9.

The information shown in FIGS. 14 and 15 is the same information shown in FIGS. 2 and 8, and 3 and 9, respectively, as described in more detail below. As such, features illustrated in FIGS. 14 and 15 that are identical to features illustrated in FIGS. 2, 3, 8 and 9, respectively, are identified using the same reference numerals used in FIGS. 2, 3, 8 and 9.

FIG. 14 is the side view of the user 38 operating the computing device 10 in the first position, similar to FIGS. 2 and 8. However, a field of view 60 of a camera included in the computing device 10 includes points of interest $pt_1$, $pt_2$, and $pt_3$ located behind the user. The field of view 60 has a lower boundary 62 and an upper boundary 64. The points of interest $pt_1$ and $pt_2$ are close to the lower boundary 62 and the point $pt_3$ is close to the upper boundary 64. The points of interest may represent any object or thing behind the user 38, for example, the corners of pictures hung on a wall, the corners of furniture, the corners of a car windshield, the corners of a building, and the like. Moreover, the points of interest may represent an animal, plant or any object located far behind the user 38. Although four points of interest are described herein, there may be more or fewer points of interest behind the user 38. The user operates the computing device 10 to capture biometric data in the same way as described herein with regard to FIGS. 2 to 4. Angles measured clockwise CW from the Y-axis, or any axis parallel to the Y-axis, are positive while angles measured counter clockwise CCW from the Y-axis, or any axis parallel to the Y-axis, are negative.

FIG. 15 is the side view of the user 38 operating the computing device 10 in the second position, similar to FIGS. 3 and 9, including the field of view 60 and the points of interest $pt_1$ and $pt_2$ positioned proximate the upper boundary 64.

Figure 16:
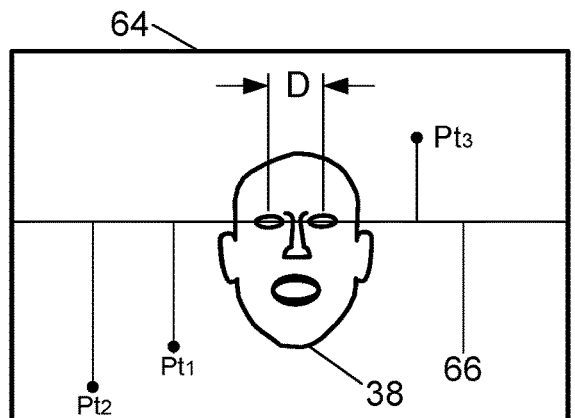
FIG. 16 is an example frame included in a video of biometric data captured from the user while the user operates the computing device in the first position.

FIG. 16 is an example frame included in a video of biometric data captured from the user while the user operates the computing device 10 in the first position. The frame includes a front view of the user 38, the points of interest $pt_1$, $pt_2$ and $pt_3$, and an eye line 66. The eye line 66 is calculated by the computing device 10 and extends between the centers of the eyes of the user. The eye line 66 may be horizontal. A distance D is the center-to-center distance between the eyes of the user 38. While the computing device 10 is moved from the first to the second position, the position of the points of interest within the field of view 60 change. Consequently, the position of the points of interest $pt_1$, $pt_2$ and $pt_3$ in each frame is typically different.

For each frame, the perpendicular distance relative to the line 66 is calculated for each point of interest. For points below the line 66 the perpendicular distances are negative and for points above the line 66 the perpendicular distances are positive. The distance D and the perpendicular distances may be calculated as a number of pixels. The distance D varies with the distance between the computing device 10 and the user during biometric data capture. More specifically, when the computing device is positioned closer to the user the number of pixels between the eyes increases, so the distance D increases. When the computing device 10 is positioned further from the user the number of pixels between the eyes decreases, so the distance D decreases.

Figure 17:
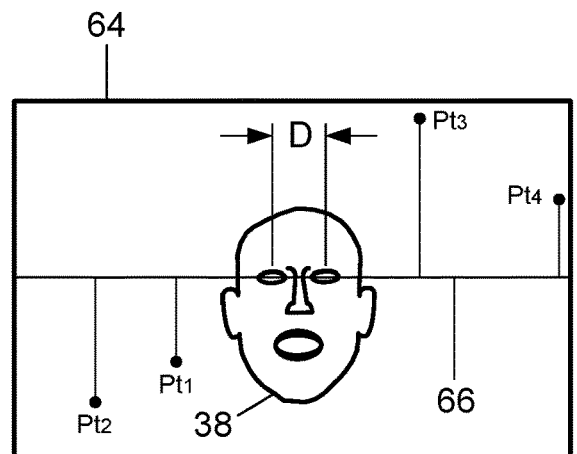
FIG. 17 is an example frame included in the video of biometric data captured from the user while the user operates the computing device and moves the computing device into the second position.

The information shown in FIG. 17 is the same information shown in FIG. 16 as described in more detail below. As such, features illustrated in FIG. 17 that are identical to features illustrated in FIG. 16 are identified using the same reference numerals used in FIG. 16.

FIG. 17 is an example frame included in the video of biometric data captured from the user while the user operates the computing device 10 and moves the computing device 10 into the second position. The frame includes a front view of the user 38, the points of interest $pt_1$, $pt_2$, and $pt_3$ as shown in FIG. 16, and a new example point of interest $pt_4$. However, the positions of the points of interest $pt_1$, $pt_2$ and $pt_3$ are different. More specifically, points $pt_1$ and $pt_2$ are positioned closer to the eye line 66 so that the perpendicular distances for these points is smaller. Point $pt_3$ is positioned further from the eye line 66 so the perpendicular distances for point $pt_3$ is greater. The point $pt_3$ is positioned close to the upper boundary 64. The point of interest $pt_4$ is positioned near a boundary of the field of view 60 and above the line 66. New points of interest may be included in the field of view 60 as the computing device 10 is moved into the second position.

Points of interest may be occluded by another object and thus not be included in the field of view 60 for one frame, but may be included in the field of view 60 for a subsequent frame. For example, in one frame, the corner of a picture hanging on a wall behind the user 38 may be occluded by a coat hanging on a coat rack behind the user 38. In a subsequent frame, the corner of the picture may be included in the field of view. New point $pt_4$ is a point of interest that was occluded in the frame illustrated in FIG. 16, but is included in the frame illustrated in FIG. 17.

Figure 18:
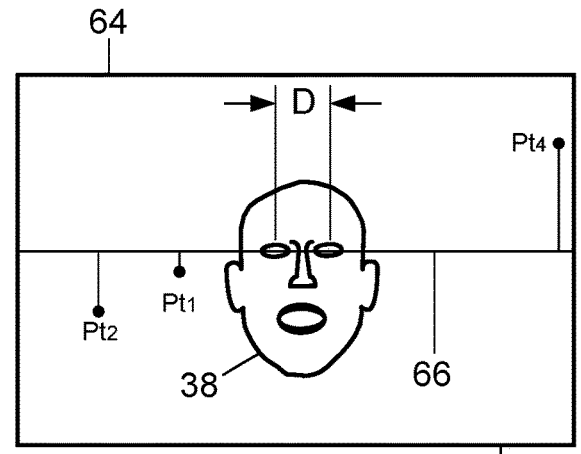
FIG. 18 is another example frame included in the video of biometric data captured from the user while the user operates the computing device and moves the computing device into the second position.

The information shown in FIG. 18 is the same information shown in FIG. 17 as described in more detail below. As such, features illustrated in FIG. 18 that is identical to features illustrated in FIG. 17 are identified using the same reference numerals used in FIG. 17.

FIG. 18 is another example frame included in the video of biometric data captured from the user while the user operates the computing device 10 and moves the computing device 10 into the second position. The frame includes a front view of the user 38 and the points of interest $pt_1$, $pt_2$, and $pt_4$, as shown in FIG. 17. However, the positions of the points of interest $pt_1$, $pt_2$, and $pt_4$ are different. More specifically, points $pt_1$ and $pt_2$ are positioned closer to the eye line 66 while the point $pt_4$ is located further from the eye line 66 and closer to the upper boundary 64. Because the positions of the points of interest $pt_1$, $pt_2$, and $pt_4$ have changed, the perpendicular distances for these points has also changed.

The point of interest $pt_3$ does not appear in this frame which indicates that the computing device 10 is positioned such that $pt_3$ is not included in the field of view 60. Alternatively, if point $pt_3$ represents a corner of an object, for example the corner of a painting, at least the corner represented by point $pt_3$ is not included in the field of view 60. A perpendicular distance is not calculated for point $pt_3$ because point $pt_3$ is not included in the field of view 60.

The perpendicular distances calculated for each point of interest are divided by the distance D to calculate, for each frame, a ratio for each point of interest therein. The ratios may be converted into percentages which are plotted over time to form a signal for each point of interest. The point of interest signals may be used to detect user liveness.

Figure 19:
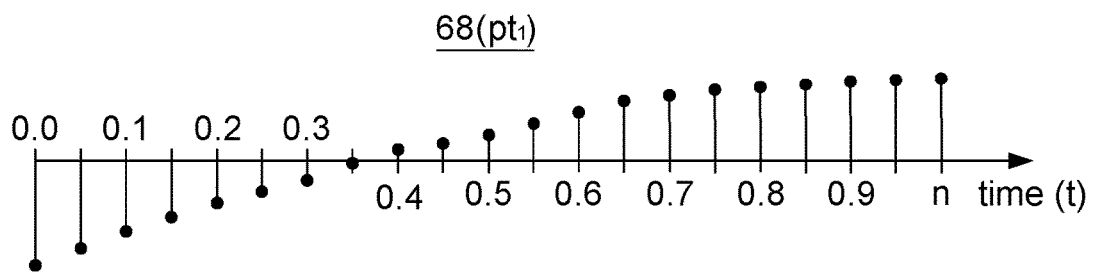
FIG. 19 is a diagram illustrating an example signal for a point of interest included in at least one frame of the video.

FIG. 19 is a diagram illustrating an example signal 68 for the point of interest $pt_1$. The signal 68 is created by plotting the percentages calculated for the point $pt_1$ in each frame over time. The signal 68 is a discrete signal that represents the change in the location of the point $pt_1$, within the field of view 60, over time.

Figure 20:
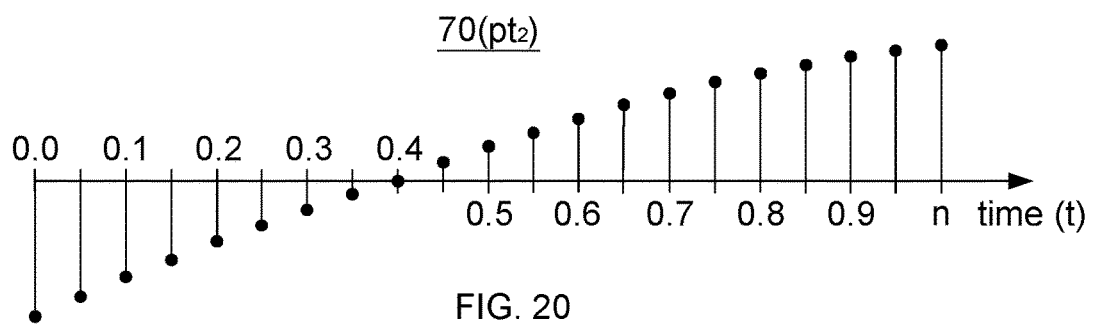
FIG. 20 is a diagram illustrating an example signal for another point of interest included in at least one frame of the video.

FIG. 20 is a diagram illustrating an example signal 70 for the point of interest $pt_2$. The signal 72 is created by plotting the percentages calculated for the point $pt_2$ in each frame over time. The signal 70 is a discrete signal that represents the change in the location of the point $pt_2$, within the field of view 60, over time. The points $pt_1$ and $pt_2$ appear in each frame so a percentage is calculated for points $pt_1$ and $pt_2$ in each frame. The duration of the signals 68 and 70 is the same as that for the signal 48.

Figure 21:
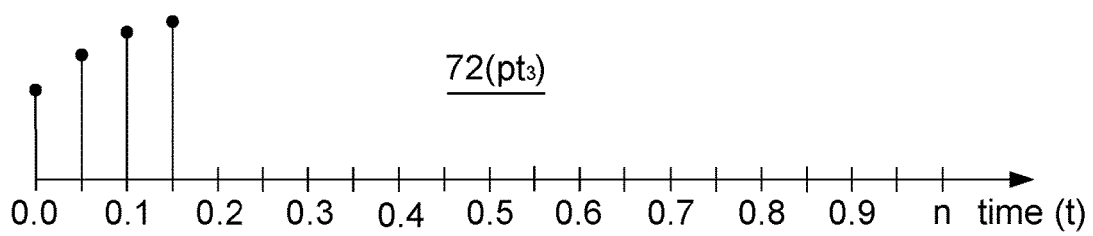
FIG. 21 is a diagram illustrating an example signal for yet another point of interest included in at least one frame of the video.

FIG. 21 is a diagram illustrating an example signal 72 of the point of interest $pt_3$. The signal 72 is created by plotting the percentages calculated for point $pt_3$. Because point $pt_3$ does not appear in the field of view 60 in all frames, a percentage is not calculated for point $pt_3$ for each frame. As a result, the signal 72 has a shorter duration than the signals 48, 68 and 70. The signal 72 extends from time t=0.0 seconds to t=0.15 seconds.

Figure 22:
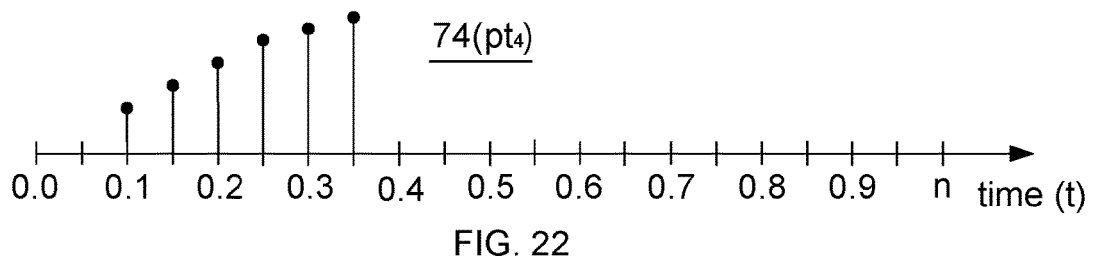
FIG. 22 is a diagram illustrating an example signal for another point of interest included in at least one frame of the video.

FIG. 22 is a diagram illustrating an example signal 74 for the point of interest $pt_4$. The signal 74 is also created by plotting the percentages calculated for point $pt_4$ over time. Like point $pt_3$, point $pt_4$ does not appear in the field of view 60 of all the frames, so a percentage for point $pt_4$ is not calculated for each frame. As a result, the signal 74 has a shorter duration than signals 48, 68 and 70. The signal 74 extends from time t=0.1 seconds to t=0.35 seconds.

Figure 23:
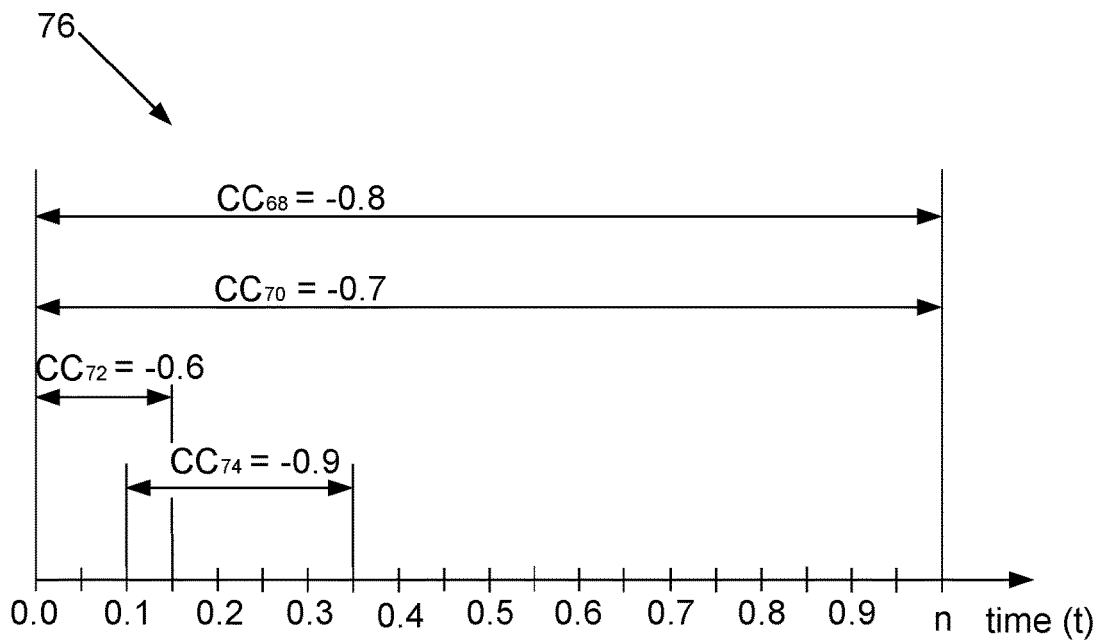
FIG. 23 is a diagram illustrating example correlation coefficients calculated between signals.

FIG. 23 is a diagram 76 illustrating example correlation coefficients calculated between the signal 48 and each of the signals 68, 70, 72, and 74. More specifically, the correlation coefficients calculated between signal 48 and signals 68, 70, 72, and 74 are, respectively, $CC_{68}=-0.8$, $CC_{70}=-0.7$, $CC_{72}=-0.06$, and $CC_{74}=0.9$.

Figure 24:
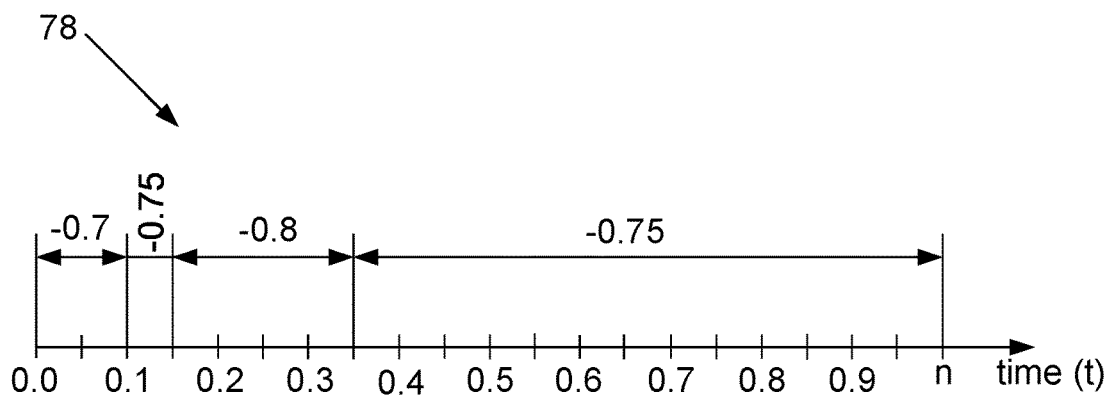
FIG. 24 is a diagram illustrating example correlation coefficients calculated for each frame.

FIG. 24 is a diagram 78 illustrating example correlation coefficients calculated for each frame from the signal correlation coefficients $CC_{68}$, $CC_{70}$, $CC_{72}$, and $CC_{74}$. More specifically, the correlation coefficient for a frame may be calculated by averaging the signal coefficients for that frame. For example, for each frame between times t=0.0 and 0.050.10 seconds the correlation coefficient may be calculated as 0.6 as −0.7 which is the average of $CC_{68}+CC_{70}+CC_{72}$. For each frame between times t=0.1 and 0.15 seconds, the correlation coefficient may be calculated as 0.55 as 0.75 which is the average of $CC_{68}+CC_{70}+CC_{72}+CC_{74}$. For each frame between times t=0.2-15 and 0.35 seconds, the correlation coefficient may be calculated as −0.8 which is the average of $CC_{68}+CC_{70}+CC_{74}$. For each frame between times t=0.35 and "n" seconds, the correlation coefficient may be calculated as −0.75 which is the average of $CC_{68}+CC_{70}$.

The similarity score between the signal 48 and the signals 68, 70, 72, and 74 is the average of the correlated coefficients calculated for the frames, multiplied by negative one (−1). The average is calculated by summing the correlation coefficients calculated for the frames, and dividing the sum by the number of temporal segments in the signal 48. Multiplying by negative one should yield more accurate user liveness detection results. Using the example correlation coefficients calculated for the frames, an example similarity score of 0.755 (i.e., (((−0.7)(2)+(−0.75)(1)+(−0.8)(4)+(−0.75)(13))/20)(−1)=0.755) may be calculated. The similarity score is compared against the threshold score and if the similarity score is at least equal to the threshold score the user is considered to be a live person. For this example, 0.755 is greater than the threshold of 0.70 so the user is determined to be a live person. Thus, user liveness may be detected using signals created from points of interest included within the field of view 60 during biometric data capture.

Although the similarity score between signal 48 and the signals 68, 70, 72, and 74 is calculated from the average of the correlation coefficients for each frame, the similarity score may alternatively be calculated from the median value of the correlation coefficients for each frame. The similarity score as described with regard to the signals described herein may alternatively be calculated using any appropriate correlation method, or may be calculated in any manner, that facilitates accurate comparison against a threshold score. For example, when the frame rate is not uniform, a weighted average may be calculated and multiplied by negative one. In other methods of calculating the similarity score, it may not be necessary to multiply by negative one.

Locations of the points of interest in the field of view 60, the distance D, the perpendicular distances, percentages, correlation coefficients are additional examples of parameters that may be generated by the computing device 10.

Figure 25:
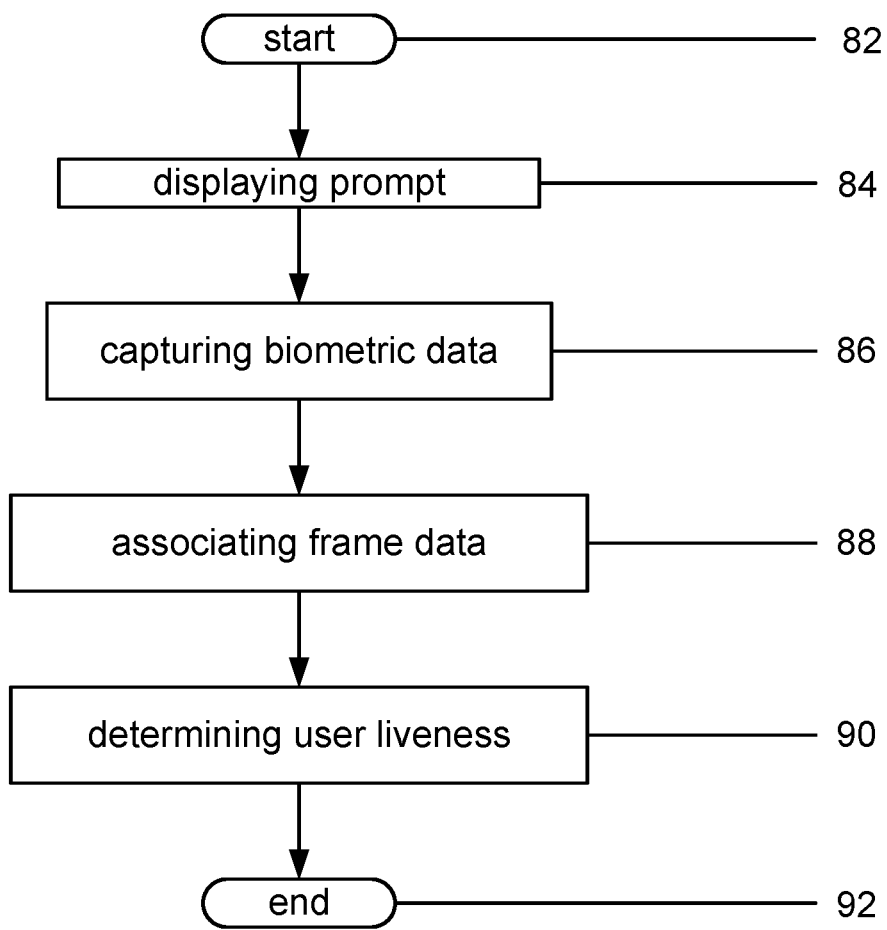
FIG. 25 is a flowchart illustrating an example method for enhancing user liveness detection.

FIG. 25 is a flowchart 80 illustrating an example method for enhancing user liveness detection. A user may be required to prove he or she is live before being permitted to conduct, using the computing device 10, a network-based transaction. Such transactions include, but are not limited to, buying merchandise from a merchant service provider website and accessing top secret information from a computer system. The method starts 82 when a user provides a claim of identity using the computing device 10, and places the computing device 10 in the first position. The user may provide the claim of identity in any manner, for example, by typing or speaking the claim of identity into the computing device 10 or selecting an identity from a list of identities. Next, the computing device 10 continues by displaying 84 a prompt for the user to see. After reading the prompt, the user moves the computing device 10 in accordance with the prompt while the computing device 10 captures biometric data 86 from the user as a video.

While the computing device 10 is moved, the computing device 10 also generates parameters for each frame of the video. For each frame, the computing device 10 associates 88 all the frame data as stored in the memory 14 with the generated parameters in the memory 14. Next, the computing device 10 continues by creating signals from the generated parameters and calculating a similarity score for the created signals. When the similarity score is at least equal to the threshold score, the computing device 10 determines 90 the user is live. Otherwise, the user is not considered live. Next, a message indicating the user is live, or not, may be transmitted to a service provider computer system operating a website and processing ends 92.

Figure 26:
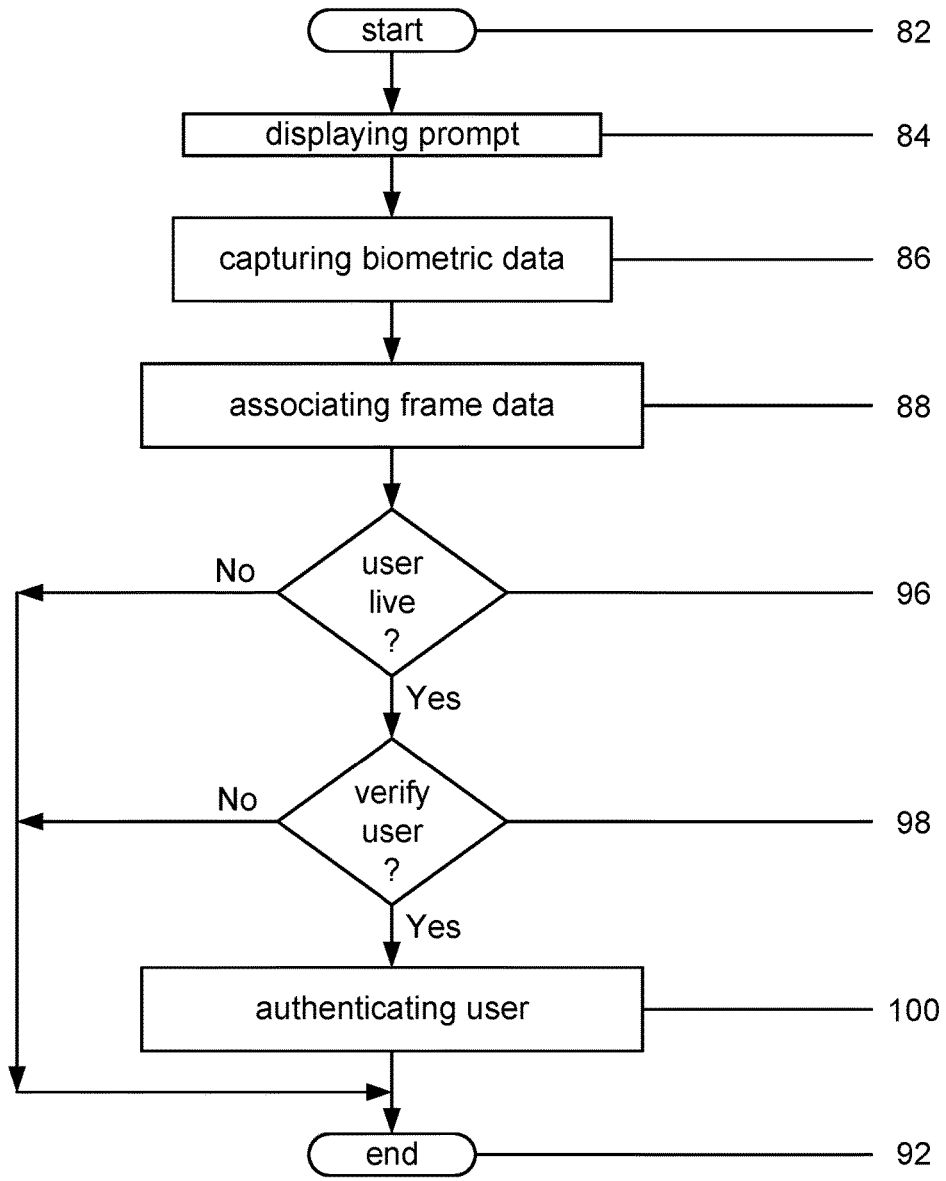
FIG. 26 is a flowchart illustrating another example method for enhancing user liveness detection.

The information shown in FIG. 26 is the same information shown in FIG. 25 as described in more detail below. As such, features illustrated in FIG. 26 that are identical to features illustrated in FIG. 25 are identified using the same reference numerals used in FIG. 25.

FIG. 26 is a flowchart 94 illustrating another example method for enhancing user liveness detection. This alternative example method is similar to that shown in FIG. 25. However, the identity of the user is also required to be verified. Thus, the user is authenticated after being deemed to be a live person and after the identity of the user is successfully biometrically verified. More specifically, after conducting operation 88, the computing device 10 creates signals from the generated parameters, calculates a similarity score for the created signals, and determines 96 whether or not the user is live. The computing device 10 compares the calculated similarity score against the threshold score. When the similarity score is less than the threshold score, the computing device determines that the user is not live and may transmit a message indicating the user is not live to a service provider computer system operating a website. Next, processing ends 92. However, when the similarity score is at least equal to the threshold score, the computing device 10 determines the user is live 96 and continues by verifying 98 the identity of the user.

More specifically, the computing device 10 continues by obtaining biometric data from any of the video frames captured by the computing device 10 while in the second position, generating a biometric template from the obtained data, and verifying the identity of the user based on the generated biometric template. When the identity of the user is not verified 98 the user is not successfully authenticated. The computing device 10 may continue by transmitting a message indicating that the user was not successfully authenticated to a service provider computer system operating a website. Next, processing ends 92. However, when the identity of the user is verified 98 the user is successfully authenticated. The computing device 10 may continue by transmitting a message indicating the user was successfully authenticated to a service provider computer system operating a web site. Next, processing ends 92.

Figure 27:
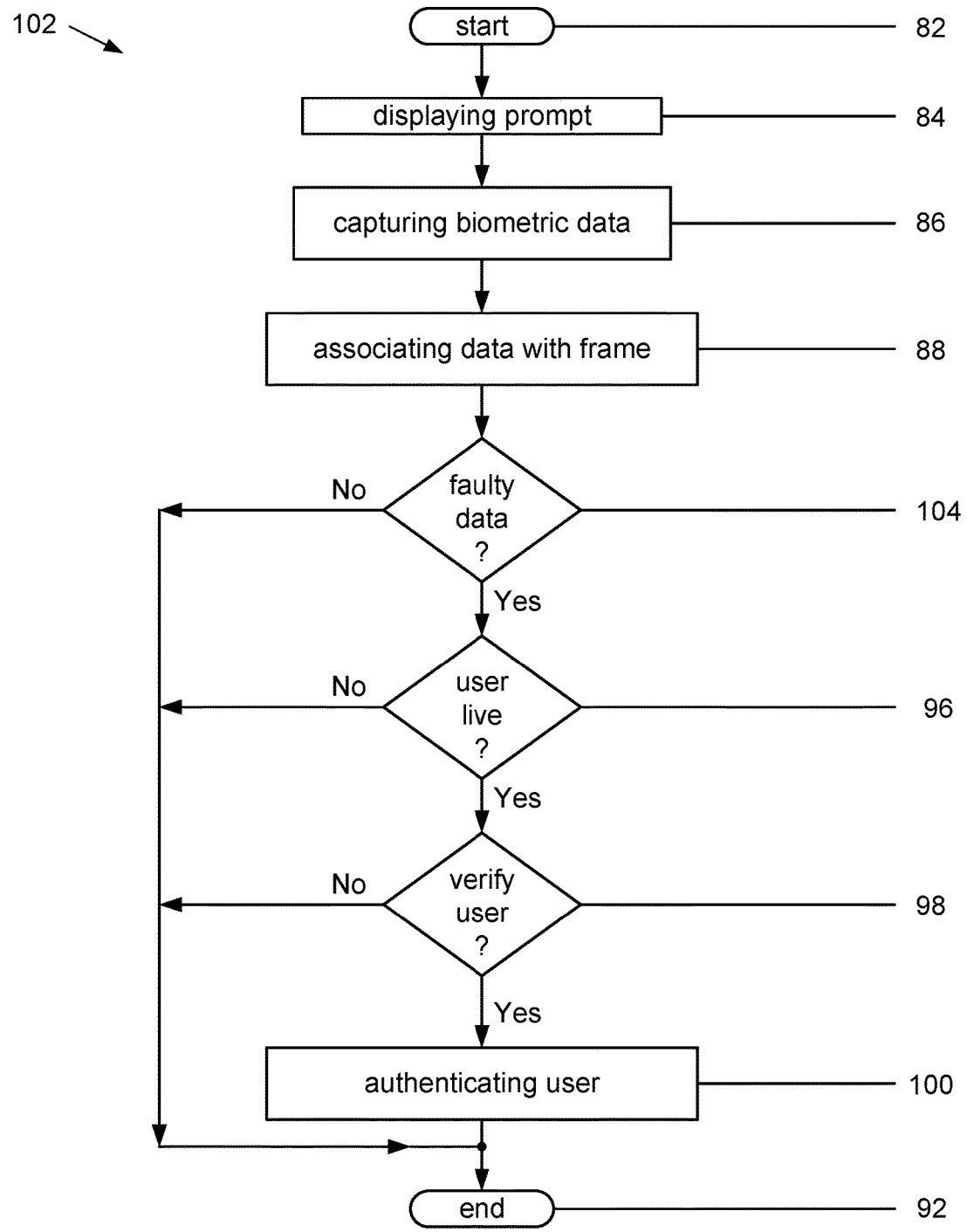
FIG. 27 is a flowchart illustrating yet another example method for enhancing user liveness detection.

The information shown in FIG. 27 is the same information shown in FIG. 26 as described in more detail below. As such, features illustrated in FIG. 27 that are identical to features illustrated in FIG. 26 are identified using the same reference numerals used in FIG. 26.

FIG. 27 is a flowchart 102 illustrating yet another example method for enhancing user liveness detection. This alternative example method is similar to that shown in FIG. 26. However, generated parameters $\theta$ and $\beta$ are analyzed to determine whether or not the calculated angles are faulty 104 before determining whether or not the user is live 96. More specifically, after conducting operation 88 the computing device 10 analyzes the calculated angular data (i.e., $\theta_x$, $\theta_y$, $\theta_z$, $\beta_x$, $\beta_y$, $\beta_z$) to verify that the angular data (i.e., $\theta_x$, $\theta_y$, $\theta_z$, $\beta_x$, $\beta_y$, $\beta_z$) can be used to generate trustworthy liveness detection results. When the calculated angular data (i.e., $\theta_x$, $\theta_y$, $\theta_z$, $\beta_x$, $\beta_y$, $\beta_z$) is deemed faulty 104, the computing device 10 continues by determining the pose of the user is invalid, and processing ends 92. However, when the calculated angular data is deemed usable for generating trustworthy liveness detection results, the computing device 10 continues by validating the pose of the user and by conducting operations 96, 98, and 100 as described herein with regard to FIG. 26. Next, processing ends 92.

The example methods described herein may be conducted entirely by the computing device 10, or partly on the computing device 10 and partly on other devices 34 and systems 36 able to communicate with the computing device 10 over the network 36. Moreover, data described herein as being stored in the memory 14 may alternatively be stored in any system 32 or device 34 able to communicate with the computing device 10 over the network 36. Furthermore, the example methods described herein are not limited to use with the specific computer systems and/or devices described herein, but rather, the methods can be utilized independently and separately from other computer systems 34, devices 36, and components described herein.

In each example embodiment, the above-described methods and systems for enhancing user liveness detection facilitate increasing the trustworthiness of user liveness detection results and of verification transaction results. More specifically, a user starts capturing biometric data as a video from his or her self with a computing device when the computing device is in a first position. The computing device captures biometric data of the user while the user moves the computing device from the first position to a second position. Moreover, the computing device generates parameters for each frame in the video and associates the generated parameters with at least biometric image data from the respective frame. The computing device generates signals from the parameters and calculates a similarity score that represents the similarity of the signals. When the similarity score is at least equal to a threshold score, the computing device concludes the user is a live person. After concluding the person is live, the computing device may continue by verifying the identity of the user, and after successfully verifying the identity of the user may authenticate the user. As a result, detection of high definition video playback spoofing attempts is facilitated to be increased, trustworthiness of user liveness detection results is facilitated to be enhanced, and costs incurred due to successful spoofing are facilitated to be reduced.

The example methods for enhancing user liveness detection described above should not be considered to imply a fixed order for performing the method steps. Rather, the method steps may be performed in any order that is practicable, including simultaneous performance of at least some steps. Moreover, the method steps may be performed in real time or in near real time. Furthermore, the invention is not limited to the embodiments of the methods described above in detail. Rather, other variations of the methods may be utilized within the spirit and scope of the claims.

What is claimed is:

1. A method for enhancing user liveness detection comprising:
   capturing, by a camera included in a computing device, facial images of a user in a video;
   calculating, by the computing device, parameters for frames included in the video, each parameter resulting from movement of the computing device during said capturing step;
   creating a signal for each parameter;
   determining whether or not each signal is usable for detecting liveness;
   determining each signal is usable for detecting liveness;
   calculating a similarity score, the similarity score indicating the similarity between the signals; and
   determining the user is live when the similarity score is at least equal to a threshold score.

2. A method for enhancing user liveness detection in accordance with claim 1, said calculating parameters step further comprising calculating, for each frame, an angle of light illuminating the biometric data.

3. A method for enhancing user liveness detection in accordance with claim 2, said calculating parameters step further comprising calculating a second angle for each frame, the second angle being between a plane defined by a front face of the computing device and a vertical axis.

4. A method for enhancing user liveness detection in accordance with claim 1, said calculating parameters step further comprising:
   calculating a perpendicular distance for each point of interest within a field of view of the computing device; and
   calculating an angle for each frame, the angle being between a plane defined by a front face of the computing device and a vertical axis.

5. A computing device for enhancing user liveness detection comprising:
   a processor; and
   a memory configured to store data, said computing device being associated with a network and said memory being in communication with said processor and having instructions stored thereon which, when read and executed by said processor, cause said computing device to:
   capture facial images of a user in a video;
   calculate parameters for frames included in the video, each parameter resulting from movement of said computing device during capture of the facial images;
   create a signal for each parameter;
   determine whether each signal is usable for detecting liveness;
   when each signal is usable for detecting liveness calculate a similarity score, the similarity score indicating the similarity between the signals; and
   determine the user is live when the similarity score is at least equal to a threshold score.

6. A computing device for enhancing user liveness detection in accordance with claim 5, wherein the instructions when read and executed by said processor, cause said computing device to calculate, for each frame, an angle of light illuminating the biometric data.

7. A computing device for enhancing user liveness detection in accordance with claim 6, wherein the instructions when read and executed by said processor, cause said computing device to calculate a second angle for each frame, the second angle being between a plane defined by a front face of the computing device and a vertical axis.

8. A computing device for enhancing user liveness detection in accordance with claim 6, wherein the instructions when read and executed by said processor, cause said computing device to:
   calculate a perpendicular distance for each point of interest within a field of view of the computing device; and
   calculate an angle for each frame, the angle being between a plane defined by a front face of the computing device and a vertical axis.

9. A method for enhancing user liveness detection comprising:
   calculating, by a computing device, an illumination-based parameter for frames included in a video of captured face biometric data, the parameter resulting from movement of the computing device during capture of the biometric data;
   creating a signal for the parameter;
   calculating a total change in the signal and incremental changes between sequential frames; and
   determining the user is live when the signal is monotonous, the total change is at least ten degrees, and the incremental change between all sequential frames is less than twenty percent of the total change.

* * * * *